(12) United States Patent
Natsume et al.

(10) Patent No.: US 6,522,838 B1
(45) Date of Patent: Feb. 18, 2003

(54) OPTICAL APPARATUS, OPTICAL ELEMENT DRIVING UNIT, AND PHOTOGRAPHING SYSTEM

(75) Inventors: Satoshi Natsume, Sagamihara (JP); Kazumasa Yoshikawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/603,036

(22) Filed: Jun. 26, 2000

(30) Foreign Application Priority Data

Jun. 28, 1999 (JP) ............................ 11-182171
Oct. 28, 1999 (JP) ............................ 11-307145

(51) Int. Cl.$^7$ .................... G03B 17/00; G03B 3/12; H04N 5/232
(52) U.S. Cl. .................... 396/76; 396/86; 396/103; 352/179; 348/211.99
(58) Field of Search .................... 396/75, 76, 81, 396/82, 86, 103; 348/211.99, 213; 352/53, 179

(56) References Cited

U.S. PATENT DOCUMENTS

| | | | |
|---|---|---|---|
| 3,798,611 A | * | 3/1974 | Gallant et al. .................. 345/1 |
| 4,244,006 A | * | 1/1981 | Kitahara et al. ............ 358/210 |
| 4,937,602 A | | 6/1990 | Himuro et al. |
| 5,068,735 A | * | 11/1991 | Tuchiya et al. ............. 358/209 |
| 5,189,458 A | | 2/1993 | Miyamoto et al. |
| 5,815,745 A | * | 9/1998 | Ohsawa ........................ 396/76 |
| 5,893,651 A | * | 4/1999 | Sakamoto ..................... 396/86 |
| 6,035,137 A | * | 3/2000 | Kaneko et al. ................ 396/76 |
| 6,052,537 A | * | 4/2000 | Sasaki ......................... 396/103 |

FOREIGN PATENT DOCUMENTS

| | | |
|---|---|---|
| EP | 0 682 450 | 11/1995 |
| JP | 04-098229 | 3/1992 |

OTHER PUBLICATIONS

An European Search Report dated May 5, 2002, issued in the counterpart European patent application No. 00 30 5406.

* cited by examiner

Primary Examiner—Russell Adams
Assistant Examiner—Arthur A Smith
(74) Attorney, Agent, or Firm—Morgan & Finnegan, LLP

(57) ABSTRACT

An optical apparatus has an operation member for permitting a first operation and a second operation; a position detector for detecting a position of an optical element; a target position setting device for permitting arbitrary setting of a target position in driving of the optical element; and a control for controlling the driving of the optical element. The control stores the position of the optical element detected by the position detector and drives the optical element to the target position set by the target position setting device, in response to the first operation of the operation member, and the control drives the optical element to the stored position of the optical element detected by the position detector, in response to the second operation of the operation member.

50 Claims, 17 Drawing Sheets

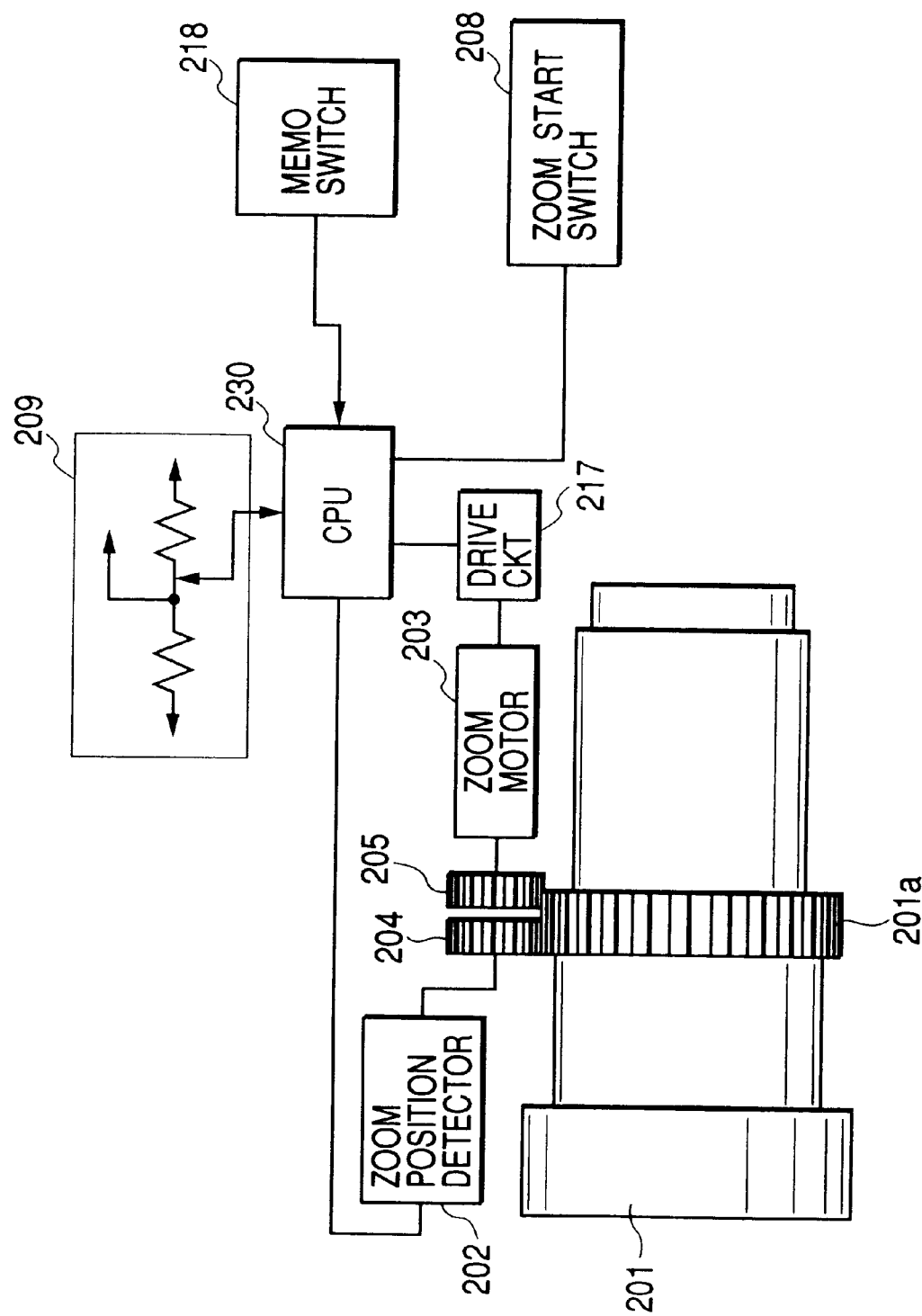

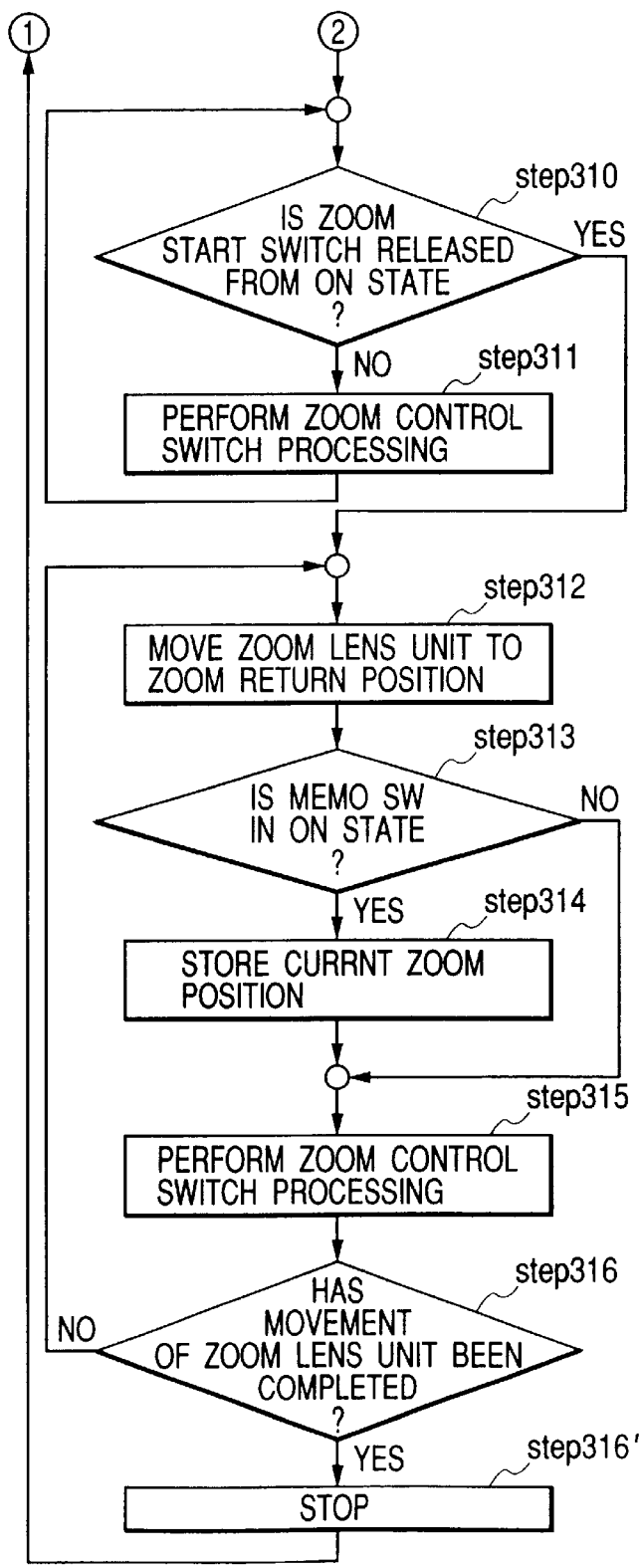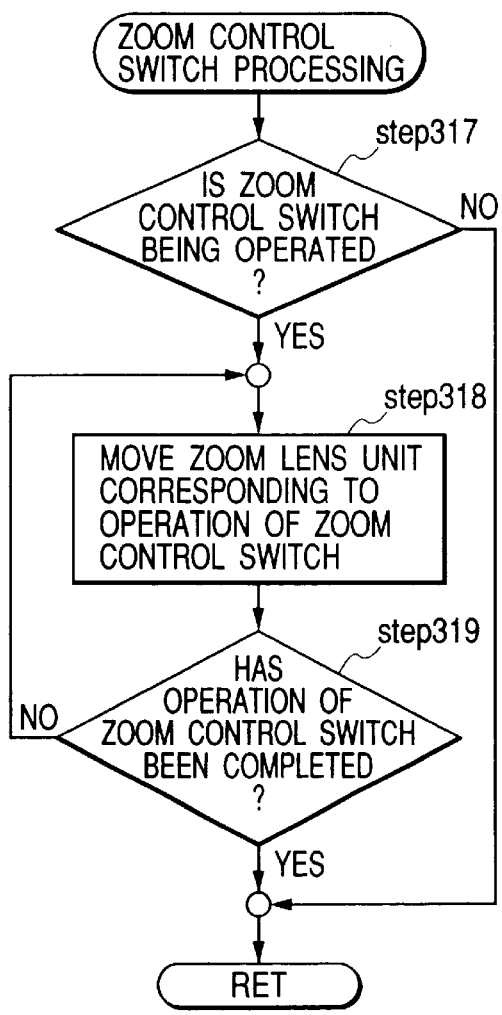

OPTICAL APPARATUS, OPTICAL ELEMENT DRIVING UNIT, AND PHOTOGRAPHING SYSTEM

BACKGROUND OF THE INVENTION

1. Field of the Invention

The present invention relates to an optical apparatus, an optical element driving unit, and a photographing system used in TV cameras, video cameras, and so on.

2. Related Background Art

A variety of photographing techniques are employed in TV and video photography and one of them is a photographing technique wherein during photography of an object at a certain zoom magnification, the magnification is altered to another zoom magnification, and thereafter the magnification is returned to the original zoom magnification to continue the photography.

For implementing the photographing technique of this type, there are two conventional approaches; a manual method in which an operator remembers a current zoom position, alters the zoom magnification by servo driving or manual driving, and thereafter returns the zoom lens to the original zoom position by servo driving or manual driving; and a method, as illustrated in FIG. 18 and FIG. 19, in which an external device called an external preset box is coupled to a camera or a lens mounted on a tripod or the like and in which the zoom lens is automatically moved between the above two positions through operation of the preset box.

Further, EP0682450A1, Japanese Patent Application Laid-Open No. 11-160604, and Japanese Patent Application Laid-Open No. 11-271592 disclose the technology of moving the zoom lens to the telephoto extreme during photography and thereafter returning the zoom lens to the original position to continue the photography.

In the photography with the tripod or the like, zooming and focusing is controlled through zoom demand 20 and focus demand 21. The aforementioned preset box is often mounted on the zoom demand 20.

As illustrated in FIG. 19, the preset box is provided with switches 22, 23, 24 for initiating zoom movement and volumes 25, 26, 27 for permitting the operator to preset desired zoom positions for zoom movement. The switches and volumes are paired in correspondence with each other, and with depression of either switch, the zoom lens is moved to the zoom position preset by the corresponding volume.

For example, the operator presets two objective zoom positions for photography by the volumes 25, 26 and first depresses the switch 1 to move the zoom lens to one preset position and photograph the object. Thereafter, the operator depresses the switch 2 to move the zoom lens to the other preset position and photograph the object at another magnification. Further, the operator depresses the switch 1 to return the magnification to the original zoom magnification and photograph the object thereat.

In practical photography, however, the operator needs to be considerably skilled in the method in which the operator first remembers the original zoom position and then manually returns the lens to the original position, and it is not always assured that the operator, even if well skilled, can reproduce exactly the same original zoom position.

Reproducibility can be improved by use of the preset box, but the box tends to become large, because it necessitates at least two volumes and two switches. This degrades the carryability of the camera system and the large box has to be always kept at hand. Namely, this system can be used with few problems in cases where the camera and lens can be fixed on the tripod or the like in photography at a studio or the like, because the operator can keep the box at hand. On the other hand, in cases where the system is used for outdoor photography without use of the tripod or the like, it is considerably difficult to use the system in practice, because there is no way of mounting this box.

Further, with use of the preset box, for example, when the operator desires to set the current zoom position as one preset position, it is difficult for the operator to accurately match the control position of the volume with the current zoom position perceived through a viewer mounted on the TV camera or through the viewfinder of the video camera. As a result, it poses another problem that high reproducibility is not achieved in many cases.

In the case of the method disclosed in aforementioned EP0682450A1, Japanese Patent Application Laid-Open No. 11-160604, and Japanese Patent Application Laid-Open No. 11-271592, there arises a problem that the zoom lens cannot be moved to any other position than the telephoto extreme.

An object of the present invention is, therefore, to provide an optical apparatus, an optical element driving unit, and a photographing system with good carryability and operability, which permit the movement of the lens unit to an arbitrary preset position and the return operation to the original position with high reproducibility.

SUMMARY OF THE INVENTION

For accomplishing the above object, a first aspect of the present invention is an optical apparatus comprising:

operation means for permitting a first operation and a second operation;

position detecting means for detecting a position of an optical element;

target position setting means for permitting arbitrary setting of a target position in driving of the optical element; and control means for controlling the driving of the optical element, wherein the control means stores the position of the optical element detected by the position detecting means and drives the optical element to the target position set by the target position setting means, in response to the first operation of the operation means, and the control means drives the optical element to the stored position of the optical element detected by the position detecting means, in response to the second operation of the operation means.

In a more preferable aspect, the second operation is release of the first operation.

In a more preferable aspect, when the control means drives the optical element to the target position set by the target position setting means, in response to the first operation, and when the target position is changed to another target position by the target position setting means without execution of the second operation, the control means drives the optical element to the target position after the change.

In a more preferable aspect, the optical element is a lens unit having zooming action.

In a more preferable aspect, the optical apparatus comprises a lens unit having focusing action, in addition to the lens unit having the zooming action, and the lens unit having the zooming action is located at a position closer to the image plane than the lens unit having the focusing action.

In a more preferable aspect, the optical apparatus comprises a lens unit having focusing action, in addition to the lens unit having the zooming action, and the lens unit having the focusing action is located at a position closer to the image plane than the lens unit having the zooming action.

In a more preferable aspect, the optical apparatus comprises: a lens unit having focusing action, in addition to the lens unit having the zooming action; and focusing lens position detecting means for detecting a position of the lens unit having the focusing action; and the control means stores the position of the lens unit having the focusing action, detected by the focusing lens position detecting means, and drives the lens unit having the focusing action to a position where an in-focus state is achieved with respect to the lens unit having the zooming action, driven to the target position, in response to the first operation, and the control means drives the lens unit having the focusing action to the stored position of the lens unit having the focusing action, detected by the focusing lens position detecting means, in response to the second operation.

In a more preferable aspect, the control means calculates a position of the lens unit having the focusing action where the in-focus state is achieved, in response to the first operation, and drives the lens unit having the focusing action to the position thus calculated.

In a more preferable aspect, the optical apparatus comprises focus detecting means for detecting a focus state, and, in response to the first operation, the control means drives the lens unit having the focusing action until the focus detecting means detects the in-focus state.

In a more preferable aspect, the target position setting means comprises a volume for variably outputting an electric signal corresponding to the target position of the optical element.

In a more preferable aspect, the target position setting means can set the target position of the optical element on a stepless basis.

In a more preferable aspect, the target position setting means can set the target position of the optical element on a stepwise basis.

In a more preferable aspect, the target position setting means comprises an on/off switch; and when the switch is switched on, the target position setting means sets a position of the optical element detected at the time of on by the position detecting means, as the target position.

In a more preferable aspect, the target position setting means comprises a plurality of on/off switches; and when the plurality of switches all are switched on, the target position setting means sets a position of the optical element detected at the time of on by the position detecting means, as the target position.

In a more preferable aspect, when the target position setting means is switched on and when the first operation is performed, the target position setting means sets a position of the optical element detected at this time by the position detecting means, as the target position.

In a more preferable aspect, when the on operation of the target position setting means and the first operation are carried out simultaneously, the target position setting means sets a position of the optical element detected at this time by the position detecting means, as the target position.

In a more preferable aspect, the optical apparatus comprises a control unit provided with an operation member for control in order to give a command of a driving direction, a driving amount, a driving position, a driving speed, or the like of the optical element; and the operation means and the target position setting means are mounted on the control unit.

In a more preferable aspect, the optical apparatus comprises an operation member for control in order to give a command of a driving direction, a driving amount, a driving position, a driving speed, or the like of the optical element; and when the operation member for control is operated after execution of the second operation and before arrival of the optical element at the position stored in response to the first operation, the control means stores a position of the optical element at the time of completion of the operation of the operation member for control, in place of the position stored in response to the first operation.

In a more preferable aspect, the control means comprises a switch for starting the driving of the optical element.

In a more preferable aspect, the position detecting means outputs an electric signal according to a current position of the optical element.

In a more preferable aspect, the control means comprises an electric circuit.

In a more preferable aspect, the control means comprises a CPU.

In a more preferable aspect, the optical apparatus is a lens apparatus comprising a lens unit having zooming action, a lens unit having focusing action, and a stop.

For accomplishing the above object, a second aspect of the present invention is an optical element driving unit, mounted on or connected to an optical apparatus body, for driving and controlling an optical element in the optical apparatus body, the optical element driving unit comprising:

operation means for permitting a first operation and a second operation;

position detecting means for detecting a position of the optical element;

target position setting means for permitting arbitrary setting of a target position in driving of the optical element; and control means for controlling the driving of the optical element, wherein the control means stores the position of the optical element detected by the position detecting means and drives the optical element to the target position set by the target position setting means, in response to the first operation of the operation means, and the control means drives the optical element to the stored position of the optical element detected by the position detecting means, in response to the second operation of the operation means.

In a more preferable aspect, the second operation is release of the first operation.

In a more preferable aspect, when the control means drives the optical element to the target position set by the target position setting means, in response to the first operation, and when the target position is changed to another target position by the target position setting means without execution of the second operation, the control means drives the optical element to the target position after the change.

In a more preferable aspect, the optical element is a lens unit having zooming action, and the control means drives the lens unit having the zooming action in the optical apparatus body.

In a more preferable aspect, the optical element driving unit comprises focusing lens position detecting means for detecting a position of a lens unit having focusing action in the optical apparatus; and the control means stores the position of the lens unit having the focusing action, detected by the focusing lens position detecting means and drives the lens unit having the focusing action to a position where an in-focus state is achieved with respect to the lens unit having the zooming action, driven to the target position, in response to the first operation, and the control means drives the lens unit having the focusing action to the stored position of the lens unit having the focusing action, detected by the focusing lens position detecting means, in response to the second operation.

In a more preferable aspect, the target position setting means comprises a volume for variably outputting an electric signal corresponding to the target position of the optical element.

In a more preferable aspect, the target position setting means comprises an on/off switch; and when the switch is switched on, the target position setting means sets a position of the optical element detected at the time of on by the position detecting means, as the target position.

In a more preferable aspect, the optical element driving unit comprises an operation member for control in order to give a command of a driving direction, a driving amount, a driving position, a driving speed, or the like of the optical element; and when the operation member for control is operated after execution of the second operation and before arrival of the optical element at the position stored in response to the first operation, the control means stores a position of the optical element at the time of completion of the operation of the operation member for control, in place of the position stored in response to the first operation.

In a more preferable aspect, the optical element driving unit is a lens driving unit for driving a lens unit having zooming action, a lens unit having focusing action, and so on.

For accomplishing the above object, a third aspect of the present invention is a photographing system comprising an optical apparatus, the photographing system comprising:

operation means for permitting a first operation and a second operation;

position detecting means for detecting a position of an optical element;

target position setting means for permitting arbitrary setting of a target position in driving of the optical element;

control means for controlling the driving of the optical element; and photoelectric conversion means for converting light from an optical system of the optical apparatus to an electric signal, wherein the control means stores the position of the optical element detected by the position detecting means and drives the optical element to the target position set by the target position setting means, in response to the first operation of the operation means, and the control means drives the optical element to the stored position of the optical element detected by the position detecting means, in response to the second operation of the operation means.

In a more preferable aspect, the second operation is release of the first operation.

In a more preferable aspect, when the control means drives the optical element to the target position set by the target position setting means, in response to the first operation, and when the target position is changed to another target position by the target position setting means without execution of the second operation, the control means drives the optical element to the target position after the change.

In a more preferable aspect, the optical element is a lens unit having zooming action, and the control means drives the lens unit having the zooming action in the optical apparatus.

In a more preferable aspect, the photographing system comprises focusing lens position detecting means for detecting a position of a lens unit having focusing action in the optical apparatus; and the control means stores the position of the lens unit having the focusing action, detected by the focusing lens position detecting means, and drives the lens unit having the focusing action to a position where an in-focus state is achieved with respect to the lens unit having the zooming action, driven to the target position, in response to the first operation, and the control means drives the lens unit having the focusing action to the stored position of the lens unit having the focusing action, detected by the focusing lens position detecting means, in response to the second operation.

In a more preferable aspect, the target position setting means comprises a volume for variably outputting an electric signal corresponding to the target position of the optical element.

In a more preferable aspect, the target position setting means comprises an on/off switch and when the switch is switched on, the target position setting means sets a position of the optical element detected at the time of on by the position detecting means, as the target position.

In a more preferable aspect, the photographing system comprises an operation member for control in order to give a command of a driving direction, a driving amount, a driving position, a driving speed, or the like of the optical element; and when the operation member for control is operated after execution of the second operation and before arrival of the optical element at the position stored in response to the first operation, the control means stores a position of the optical element at the time of completion of the operation of the operation member for control, in place of the position stored in response to the first operation.

BRIEF DESCRIPTION OF THE DRAWINGS

FIG. 10 is a diagram to show the structure of the zoom lens apparatus as the fifth embodiment of the present invention;

FIG. 13 is a flowchart to show the operation of the zoom lens apparatus of the fifth embodiment;

FIG. 14 is a flowchart to show the operation of the zoom lens apparatus of the fifth embodiment;

DETAILED DESCRIPTION OF THE PREFERRED EMBODIMENTS (First Embodiment)

Figure 1:
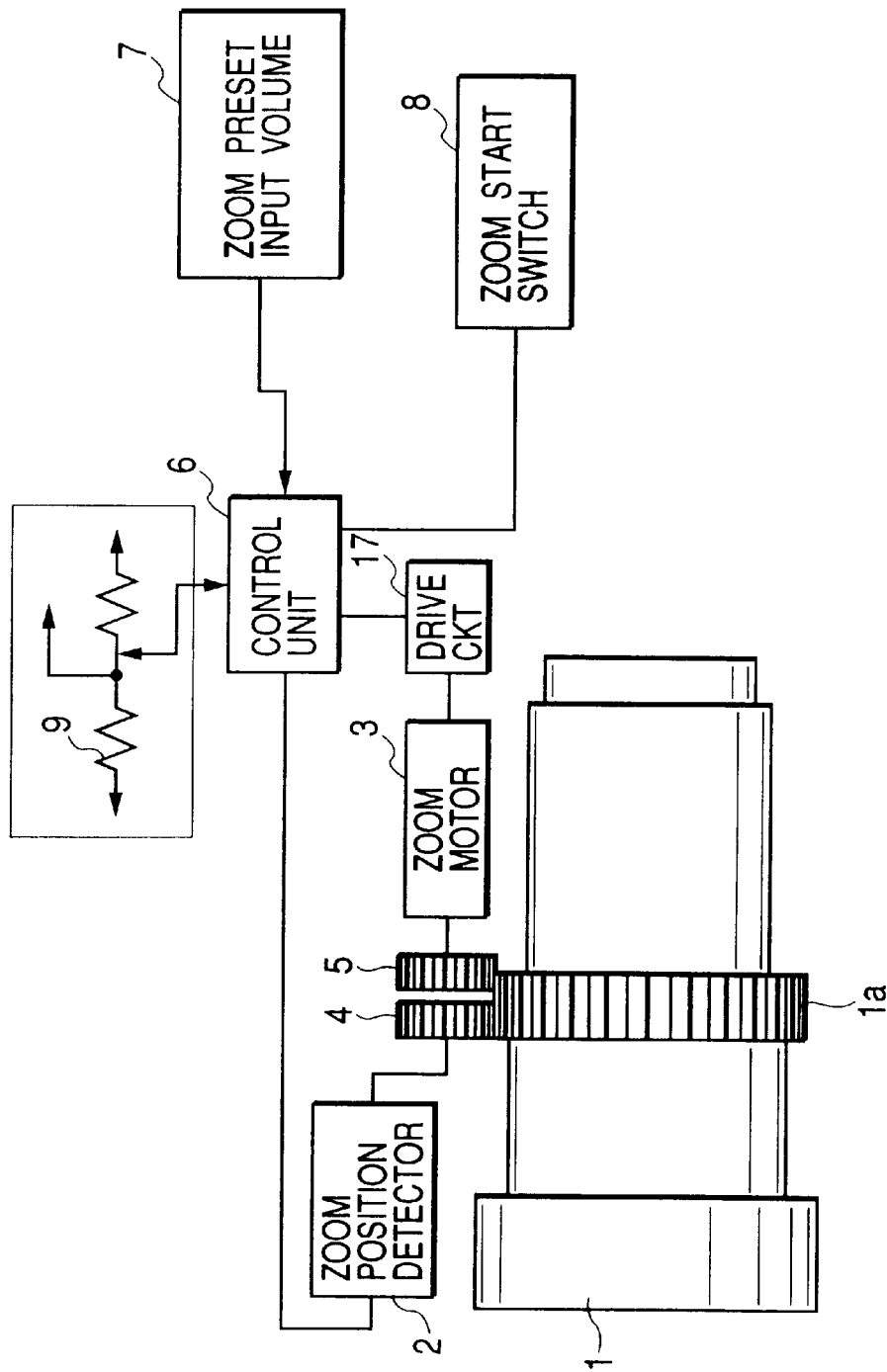
FIG. 1 is a diagram to show the structure of a zoom lens apparatus as the first embodiment of the present invention.

FIG. 1 shows the structure of the zoom lens apparatus which is the first embodiment of the present invention. This zoom lens apparatus is mounted on the TV camera or on the video camera of a carrying type.

In this figure, reference numeral 1 designates the main body of the zoom lens apparatus, which accommodates a zoom lens unit, a focus lens unit, an iris unit (neither of which is illustrated), and so on.

Numeral 3 denotes a driving motor for driving the zoom lens unit and a motor idler gear 5 is attached to an output shaft of this driving motor 3. This motor idler gear 5 is in mesh with a peripheral gear part of a zoom driving ring 1a mounted so as to be rotatable about the optical axis relative to the main body 1. Therefore, with rotation of the motor 3, the rotation is transmitted through the motor idler gear 5 and zoom driving ring 1a to a zoom driving mechanism (not illustrated) interlocked with the zoom driving ring 1a. This causes the zoom lens unit to move along the optical axis in the main body 1.

A detection idler gear 4 is in mesh with the peripheral gear part of the zoom driving ring 1a and this detection idler gear 4 is attached to a shaft part of zoom position detector 2. The zoom position detector 2 is comprised of an encoder, a potentiometer, or the like and the shaft part thereof rotates in conjunction with the rotation of the zoom driving ring 1a, whereby the detector 2 outputs an electric signal according to the rotational position of the zoom driving ring 1a, i.e., the current position (real position) between the wide-angle extreme and the telephoto extreme of the zoom lens unit.

The zoom position detector may also be a detector that outputs a signal indicating an absolute position of the zoom lens unit, depending upon how far the zoom lens unit is located, from a specific reset position.

Numeral 6 represents a control unit for controlling this zoom lens apparatus. Numeral 7 indicates a zoom preset input volume for permitting the operator to set a target position of the zoom lens unit by operating it. Numeral 8 denotes a zoom start switch (operation means) operated by the operator, for starting driving of the zoom lens unit.

Numeral 9 stands for a zoom control switch (an operation member for lens control) for permitting the operator to enter a control signal as a command of a driving direction and a driving speed (which may be replaced by a driving amount or a driving position) for servo driving of the zoom lens unit by operating it. The zoom control switch 9 is a switch that outputs a signal according to its operation direction and operation speed and that is comprised of a seesaw switch, a slide switch, an up-down switch, a rotary volume, or the like enabling variation of speed, depending upon depressing force. In another potential configuration, the operator is allowed to enter the driving speed and the driving direction through respective switches separated from each other.

Numeral 17 designates a driving circuit for driving the zoom driving motor 3. The control unit 6, motor 3, and driving circuit 17 compose the drive control means stated in the claims.

Figure 2:
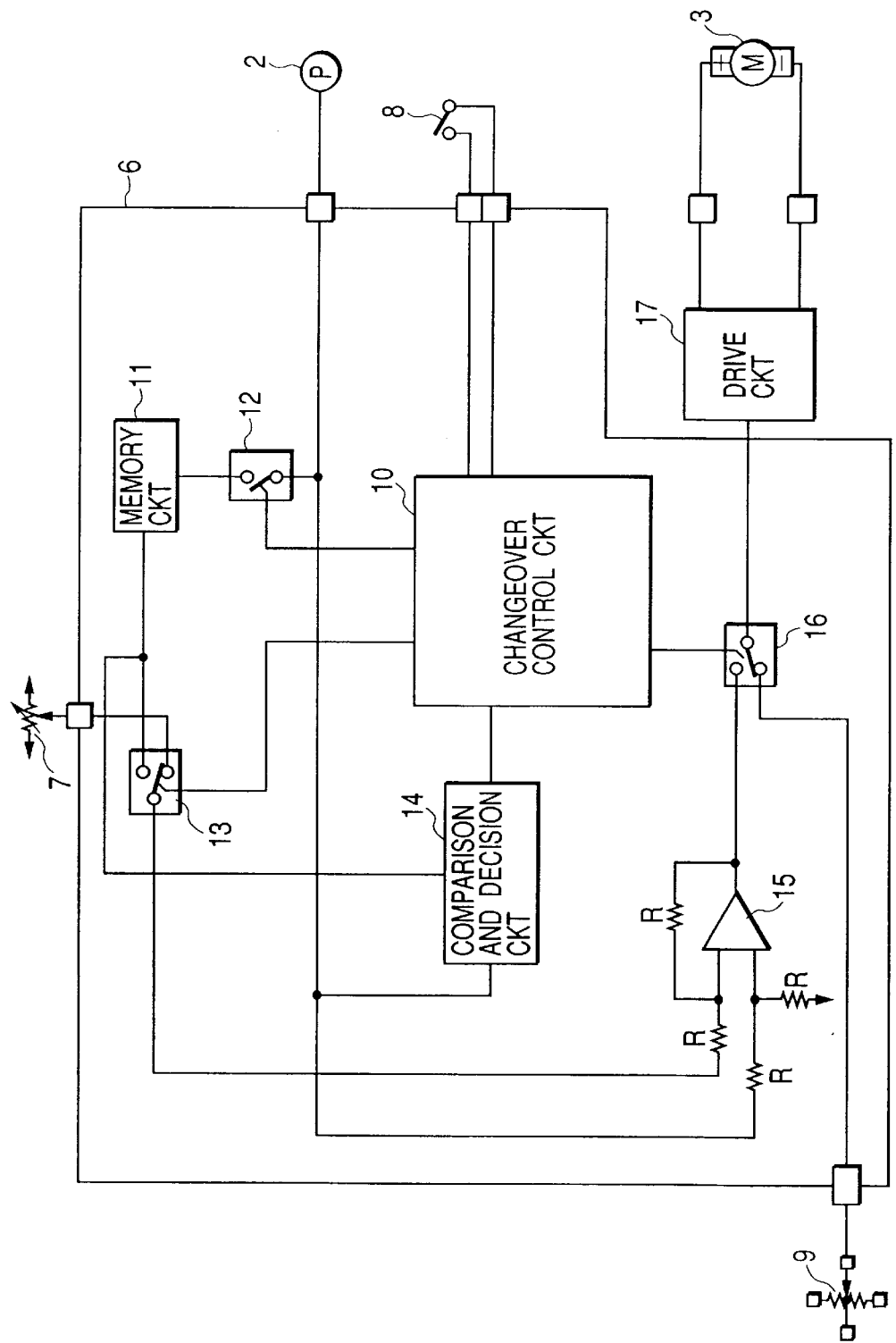
FIG. 2 is a block diagram to show an electric circuit of a control unit in the zoom lens apparatus.

A specific configuration of the control unit 6 will be described below referring to FIG. 2. In this figure, numeral 10 represents a changeover control circuit for controlling changeover of each of switches 12, 13, and 16 described hereinafter while detecting a signal from the switch 8 or the like. Numeral 11 denotes a memory circuit for storing an output signal of the zoom position detector 2 (i.e., the position of the zoom lens unit).

Numeral 12 represents a first switch that cuts off connection between the zoom position detector 2 and the memory circuit 11 in response to a signal from the changeover control circuit 10, and 13 a second switch that switches a signal inputted into one input port of differential amplifier 15 between a signal from the memory circuit 11 and a signal from the zoom preset input volume 7 in response to a signal from the changeover control circuit 10.

Numeral 14 designates a comparison and decision circuit for comparing a signal from the zoom position detector 2 with a signal from the zoom preset input volume 7 and making a decision, based thereon. Numeral 16 indicates a third ;switch that switches a signal inputted into the driving circuit 17 between a signal from the differential amplifier 15 and a signal from the zoom control switch 9 in response to a signal from the changeover control circuit 10.

The operation of the zoom lens apparatus constructed as described above will be described below. First, the operator manipulates the zoom preset input volume 7 to preset a zoom position as a target of movement (target position). At this time, the changeover control circuit 10 outputs a signal to the first switch 12 to close it and establish connection of the memory circuit 11 with the zoom position detector 2.

When the operator then switches the zoom start switch 8 on (first operation), the changeover control circuit 10 detects it and opens the first switch 12 to cut off the connection between the memory circuit 11 and the zoom position detector 2. At this time, the memory circuit 11 stores the signal from the zoom position detector 2, which indicates the zoom position at the time of disconnection.

Further, the changeover control circuit 10 outputs a signal to the third switch 16 to set it in the state of connection to the differential amplifier 15. At this time, the second switch 13 set in the state of connection to the zoom preset input volume 7 is connected to one input port of the differential amplifier 15, whereby the position signal from the zoom preset input volume 7 is entered into the differential amplifier 15. The position signal from the zoom position detector 2 is also inputted into the other input port of the differential amplifier 15, and a difference between these two inputs is outputted from the output port. The drive circuit 17 drives the zoom driving motor 3 so as to make the difference equal to zero.

The third switch 16 is set in the state of connection to the zoom control switch 9 during the normal photography without use of the zoom preset and return function as described above, and thus zoom driving can be implemented by the driving force of the driving motor 3 through the drive circuit 17 in response to the input signal from the zoom control switch 9.

When the difference output of the differential amplifier 15 becomes equal to zero in this way, the driving of the zoom lens unit is terminated. During on of the zoom start switch 8, the zoom lens unit is stopped at that position and is fixed at the zoom position set by the zoom preset input volume 7. This allows the operator to perform photography at the zoom position, i.e., at the zoom magnification, preset by the zoom preset input volume 7.

After that, when the zoom start switch 8 is released from the on operation (to perform off operation: second operation) to go into its off state, the changeover control circuit 10 detects it and outputs a signal to switch the second switch 13 to the contact for connection to the memory circuit 11. When the second switch 13 is changed over to the contact to the memory circuit 11, the signal from the memory circuit 11 is inputted into the differential amplifier 15, in place of the signal heretofore from the zoom preset input volume 7. This causes the driving circuit 17 to actuate the zoom driving motor 3 so as to make the output from the differential amplifier 15, which now indicates the difference between the position signal from the zoom position detector 2 and the position signal from the memory circuit 11, equal to zero.

On the other hand, the comparison and decision circuit 14 also compares the position signal outputted from the zoom position detector 2 with the position signal from the memory circuit 11 and sends a command signal to the changeover control circuit 10 when making the decision that the two signals become equal. Receiving this command signal, the changeover control circuit 10 outputs a signal to the third switch 16 to switch it to the contact to the zoom control switch 9. The circuit 10 also switches the second switch 13 to the contact to the zoom preset input volume 7 and switches the first switch 12 into the state of connection between the memory circuit 11 and the zoom position detector 2.

In the present embodiment, as described above, with the on operation of the zoom start switch 8, the position of the zoom lens unit at that time (so to speak, a first preset position) is stored in the memory circuit 11 and the zoom lens unit is driven to the preset position preset by the zoom preset input volume 7 (a second preset position), thus enabling the photography at the zoom magnification corresponding to this preset position. With release of the on operation of the zoom start switch 8 thereafter, the zoom lens unit is driven to the original position stored in the memory circuit 11, thus enabling the photography at the original zoom magnification.

Therefore, the present embodiment needs only one zoom start switch 8 and one zoom preset input volume 7 as elements to be operated by the operator in order to implement the movement, of the zoom lens unit between the two preset positions. Since at least two switches and two volumes were necessary before, they had to be mounted on the external device (preset box) separated from the lens apparatus and the camera. In contrast, the present embodiment permits them to be mounted on the main body of the lens apparatus. Therefore, the present embodiment obviates the need for carrying the large and extra external device like the conventional preset box, and can improve the carryability of the entire camera system consisting of the zoom lens apparatus and the camera.

In addition, since the zoom position stored in the memory circuit 11 is the position that the operator determined while watching the viewer, the finder, or the like provided in the TV camera, there is no need for such cumbersome and difficult work as to match the position of the volume with the zoom position on the viewer or the finder, which was needed in the case of use of the conventional preset box. Therefore, the apparatus of the present embodiment can be an easy-to-handle zoom lens apparatus.

Since the present embodiment assures accurate return of the zoom position to the position stored in the memory circuit 11 with release of the on operation of the zoom start switch 8, perfect reproducibility can be achieved for the zoom position.

(Second Embodiment)

The first embodiment described above was the example wherein the zoom preset and return function was realized by the hardware structure of the control unit 6, whereas the present embodiment is an example in which the zoom preset and return function is realized by software structure using a CPU. In the present embodiment, the common components to those in the first embodiment will be denoted by the same reference symbols, without describing them again herein.

Figure 3:
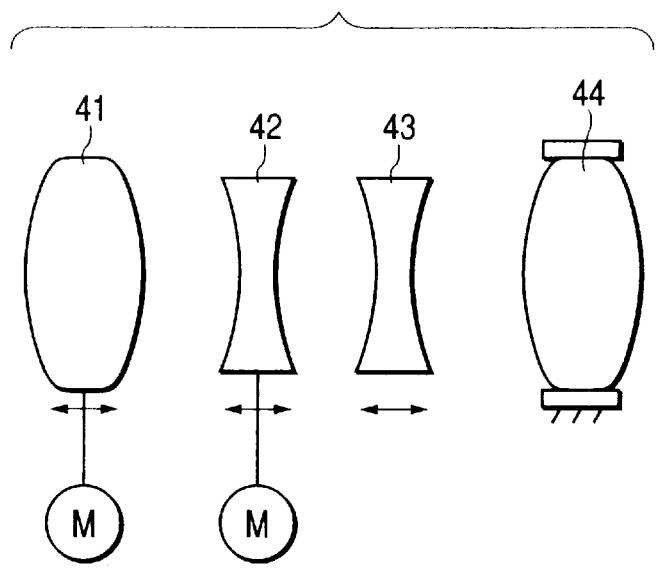
FIG. 3 is a lens layout diagram of the zoom lens apparatus as the second embodiment of the present invention.
Figure 4:
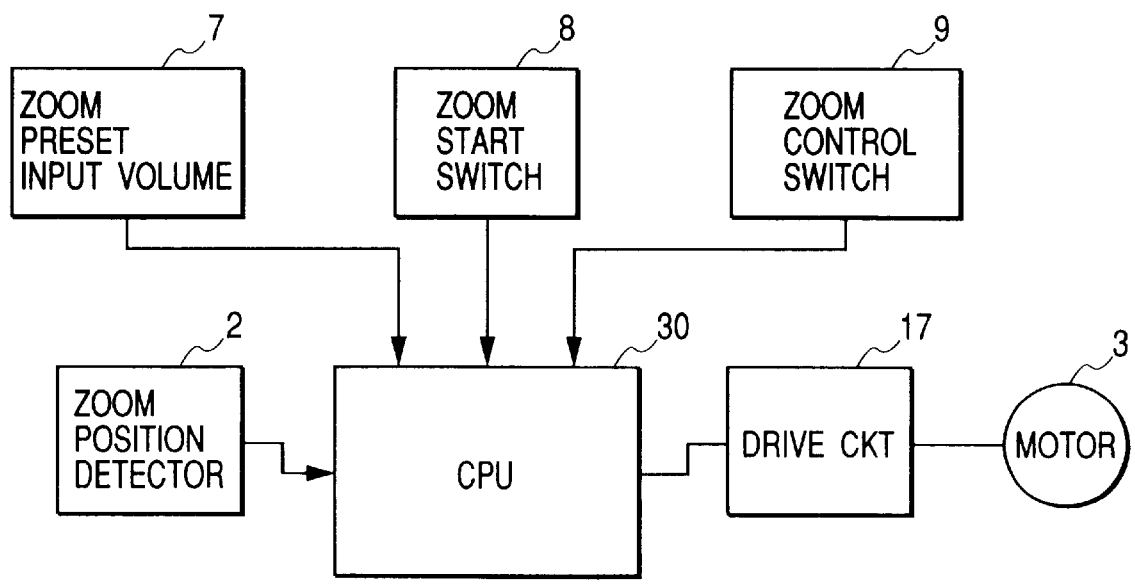
FIG. 4 is a block diagram to show an electric circuit in the zoom lens apparatus of the second embodiment.

In FIG. 3 and FIG. 4, numeral 30 designates the CPU for controlling the zoom lens apparatus of the present embodiment, 41 a front lens unit for focus adjustment (hereinafter referred to as a focus lens unit), 42 a variator lens for varying the zoom magnification (which will be referred to as a zoom lens unit), 43 a compensator lens for keeping the image position constant on the occasion of execution of zooming, and 44 a relay lens for imaging.

The present embodiment adopts the lens layout method so called the front-lens focus in which the zoom lens unit is located closer to the image plane than the focus lens unit. In this case, no focus movement occurs during zooming.

Figure 5:
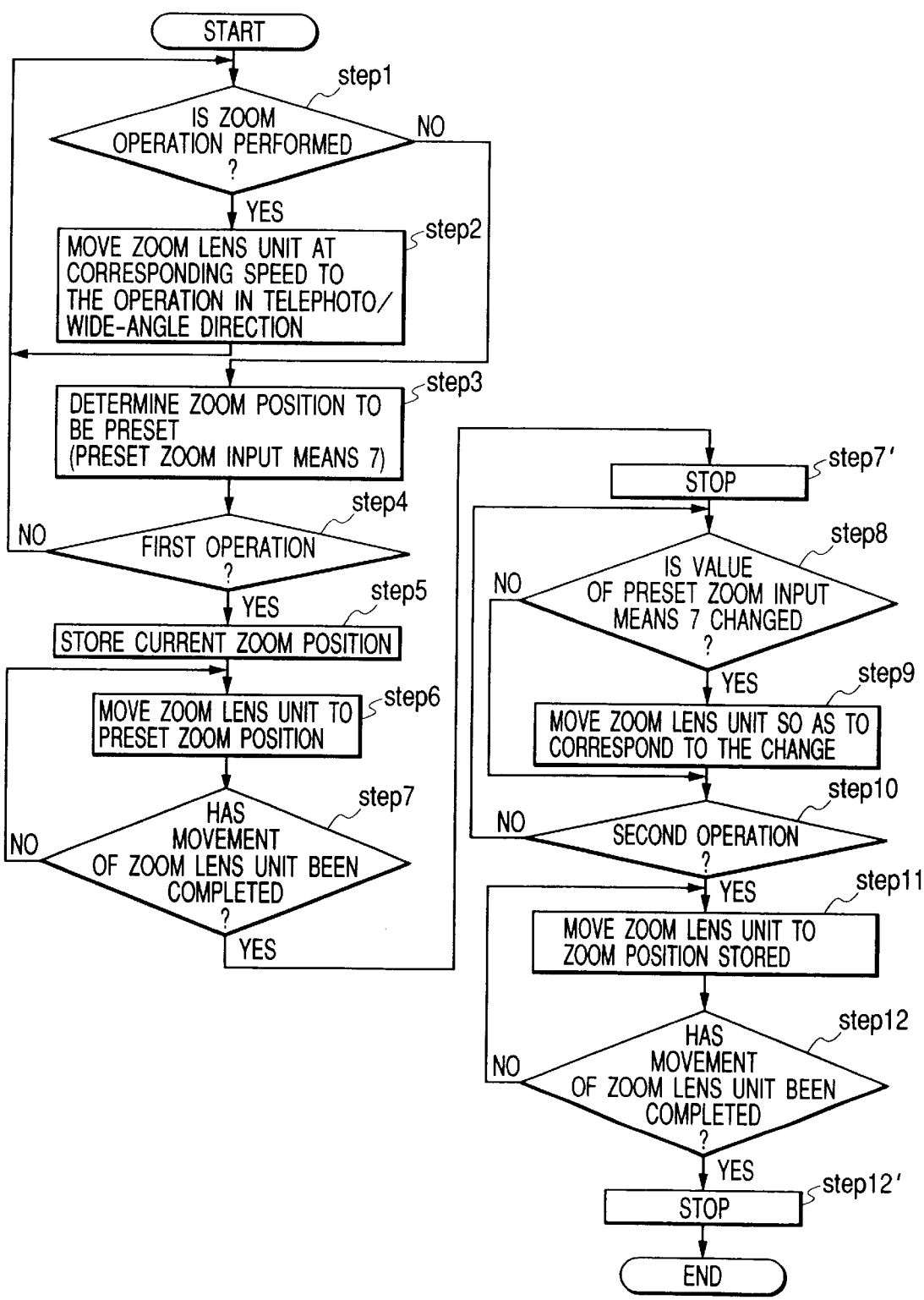
FIG. 5 is a flowchart to show the operation of the zoom lens apparatus of the second embodiment.

FIG. 5 shows the flowchart of the operation in the lens apparatus of the present embodiment. In first step 1, the CPU 30 determines whether the zoom operation is performed through the zoom control switch 9. When the zoom operation is performed, the CPU goes to step 2. In step 2, the CPU 30 moves the zoom lens unit 42 at a speed according to the operation of the zoom control switch 9 and in the telephoto/wide-angle direction according to the operation direction and then returns to step 1.

When in step 1 the zoom operation is not performed through the zoom control switch 9, the CPU moves to step 3. In step 3, the CPU 30 determines the zoom position (target position) to be preset, from the signal from the zoom preset input volume 7.

In next step 4, the CPU 30 determines whether the on operation (first operation) of the zoom start switch 8 is executed. Without execution of the on operation, the CPU goes back to step 1. With execution of the on operation, the CPU transfers to step 5.

In step 5, the CPU 30 stores the current zoom position detected by the zoom position detector 2 in an internal memory or in an external memory. Further, the CPU proceeds to step 6 to drive the zoom lens unit at the preset speed up to the zoom position preset in step 3. In step 7 the CPU 30 determines, based on the output of the zoom position detector 2, whether the movement of the zoom lens unit 42 to the preset zoom position is complete. When it is not complete yet, the CPU continues the zoom driving of step 6. If it is complete then the CPU goes to step 7' to terminate the zoom driving.

When the movement of the zoom lens unit 42 to the preset zoom position is complete, the CPU 30 goes to step 8 to determine whether the preset position is changed by manipulation of the zoom preset input volume 7. If changed then the CPU goes to step 9 to move the zoom lens unit 42 according to the change. When this movement ends thereafter or when the zoom preset input volume 7 is not manipulated in step 8, the CPU proceeds to step 10 to determine whether the release (off operation: second operation) of the on operation of the zoom start switch 8 is carried out.

When the release of the on operation of the zoom start switch 8 is not-carried out, the CPU returns to step 8. When the release of the on operation is carried out, the CPU goes to step 11 to move the zoom lens unit 42 to the zoom position stored in step 5. Then the CPU goes to step 12 to determine whether this movement is complete. When it is not complete, the CPU continuously carries out step 11. When it is complete, the CPU goes to step 12' to stop the zoom driving.

In the present embodiment, as described above, with execution of the on operation of the zoom start switch 8, the CPU 30 stores the position of the zoom lens unit at that time (so to speak, the first preset position) and the zoom, lens unit 42 is driven to the preset position (so to speak, the second preset position) preliminarily set by the zoom preset input volume 7, thereby enabling the photography at the zoom magnification corresponding to the preset position. With the release of the on operation of the zoom start switch 8 thereafter, the zoom lens unit is driven to the original position (the first preset position) stored by the CPU 30, thus enabling the photography at the original zoom magnification.

Therefore, the present embodiment also necessitates only one zoom start switch 8 and one zoom preset input volume 7 as elements to be operated by the operator in order to implement the movement of the zoom lens unit between the two preset positions, as being the case in the first embodiment. This permits these zoom start switch 8 and zoom preset input volume 7 to be disposed on the main body of the lens apparatus. Therefore, the present embodiment obviates the necessity for carrying the large and extra external device such as the conventional preset box, and can improve the carryability of the entire camera system consisting of the zoom lens apparatus and the camera.

In addition, since the zoom position stored by the CPU 30 is the position that the operator determined while watching the viewer, the finder, or the like provided in the TV camera, there is no need for such cumbersome and difficult work as to match the position of the volume with the zoom position on the viewer or the finder. Therefore, the apparatus of the present embodiment can be an easy-to-handle zoom lens apparatus.

Since the present embodiment assures accurate return of the zoom position to the position stored in the CPU 30 with the release of the on operation of the zoom start switch 8, perfect reproducibility can be achieved for the zoom position.

In the above embodiment, where the preset zoom position is a zoom position on the telephoto side and the cameraman adjusts the focus lens to the in-focus position at the zoom position and thereafter performs the second operation, the good in-focus state can be maintained throughout the entire region from the wide-angle extreme to the telephoto extreme.

(Third Embodiment)

Figure 6:
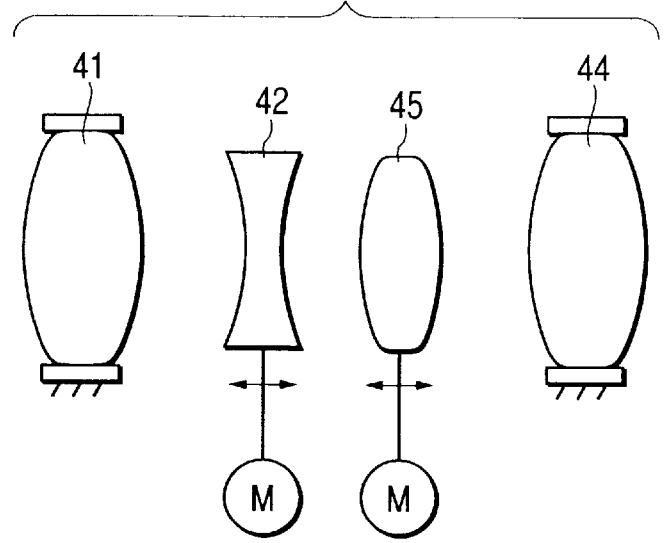
FIG. 6 is a lens layout diagram of the zoom lens apparatus as the third embodiment of the present invention.

FIG. 6 shows a lens layout of the lens apparatus which is the third embodiment of the present invention. In this figure, numeral 45 designates a rear focusing (compensator) lens for focus adjustment (hereinafter referred to as a focus lens unit), which is located closer to the image plane than the zoom lens unit 42. In the zoom lens apparatus of this rear focus type, the positional relation between the zoom lens unit 42 and the focus lens unit 45 differs depending upon change of object distance even at an equal zoom ratio, so as to vary the position of the focus lens unit 45 where the in-focus state is achieved. For this reason, the focus lens unit 45 also needs to be moved in order to keep the in-focus state with execution of the zoom movement.

Namely, the present embodiment will be described as an example of the AF lens apparatus of the rear focus type wherein the preset function is implemented by the software structure using the CPU. In the present embodiment the common components to those in the second embodiment will be denoted by the same reference symbols, without describing them again herein.

Figure 7:
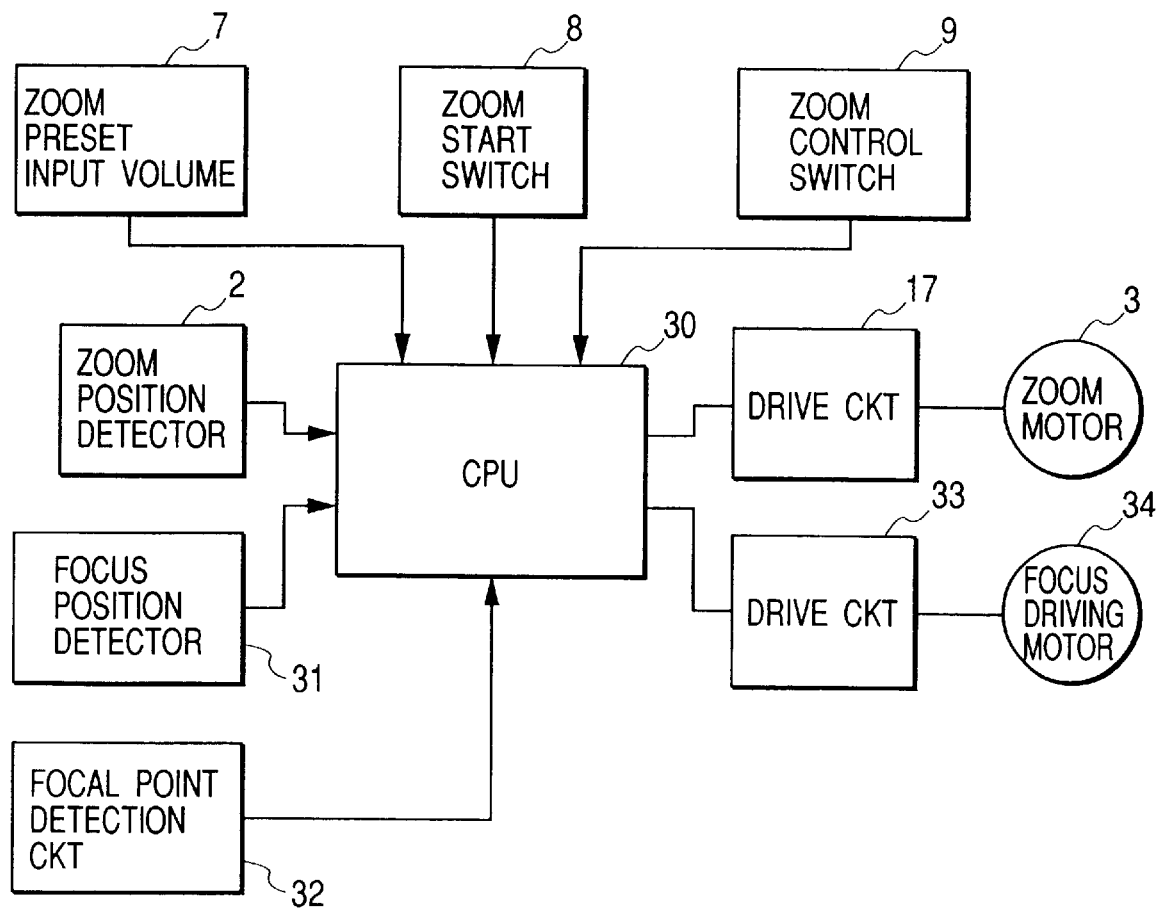
FIG. 7 is a block diagram to show an electric circuit in the zoom lens apparatus of the third embodiment.

In FIG. 7, reference numeral 31 designates a focus position detector 31, which is constructed in structure similar to the zoom position detector 2 and which outputs a signal indicating the current position (real position) of the focus lens unit 45. Numeral 32 denotes a focal point detection circuit, which is a circuit for obtaining a so-called defocus amount in order to determine a direction and an amount of the focus lens unit 45 to be driven. Further, 34 and 33 represent a focus driving motor for driving the focus lens unit 45 and a driving circuit for driving and controlling this motor 34, respectively.

Figure 8A:
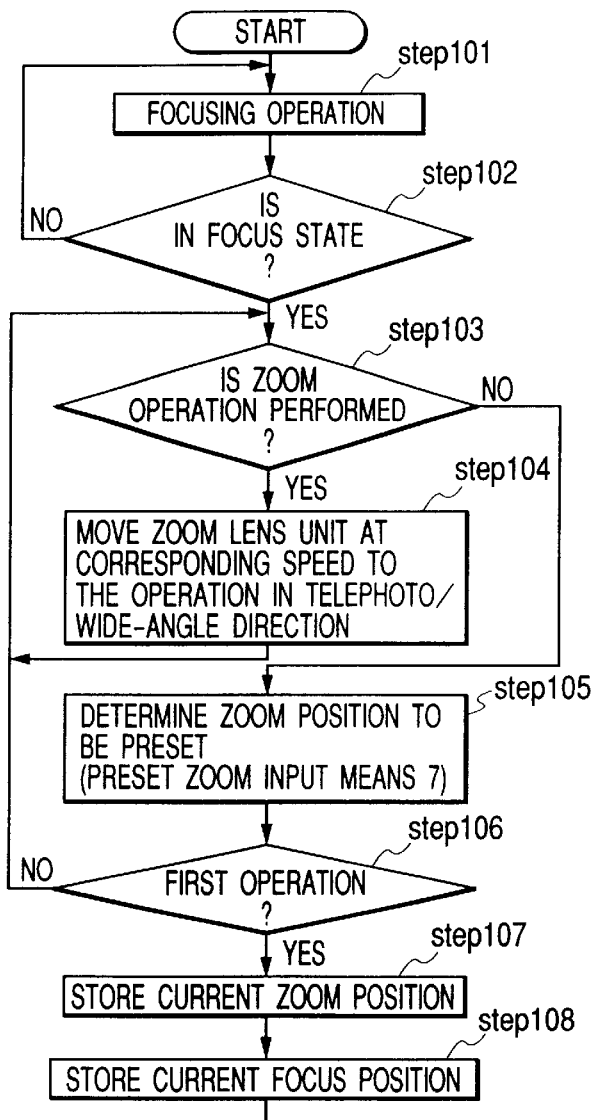
FIG. 8 which is composed of FIGS. 8A and 8B are flowcharts to show the operation of the zoom lens apparatus of the third embodiment.
Figure 8:
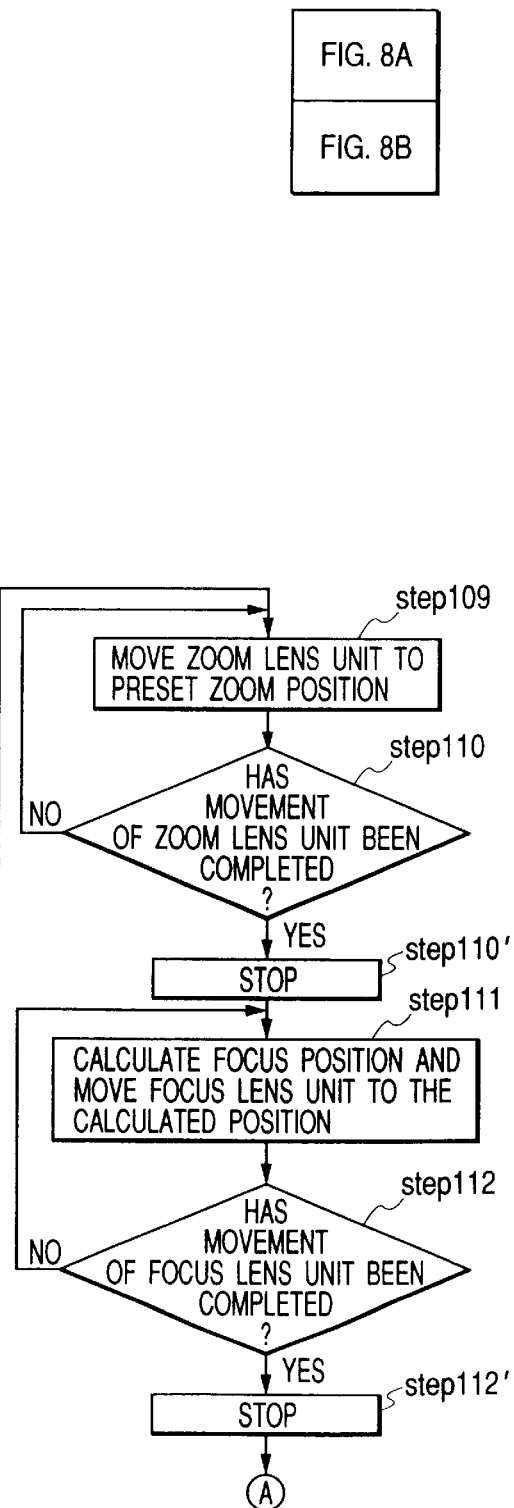
Figure 8B:
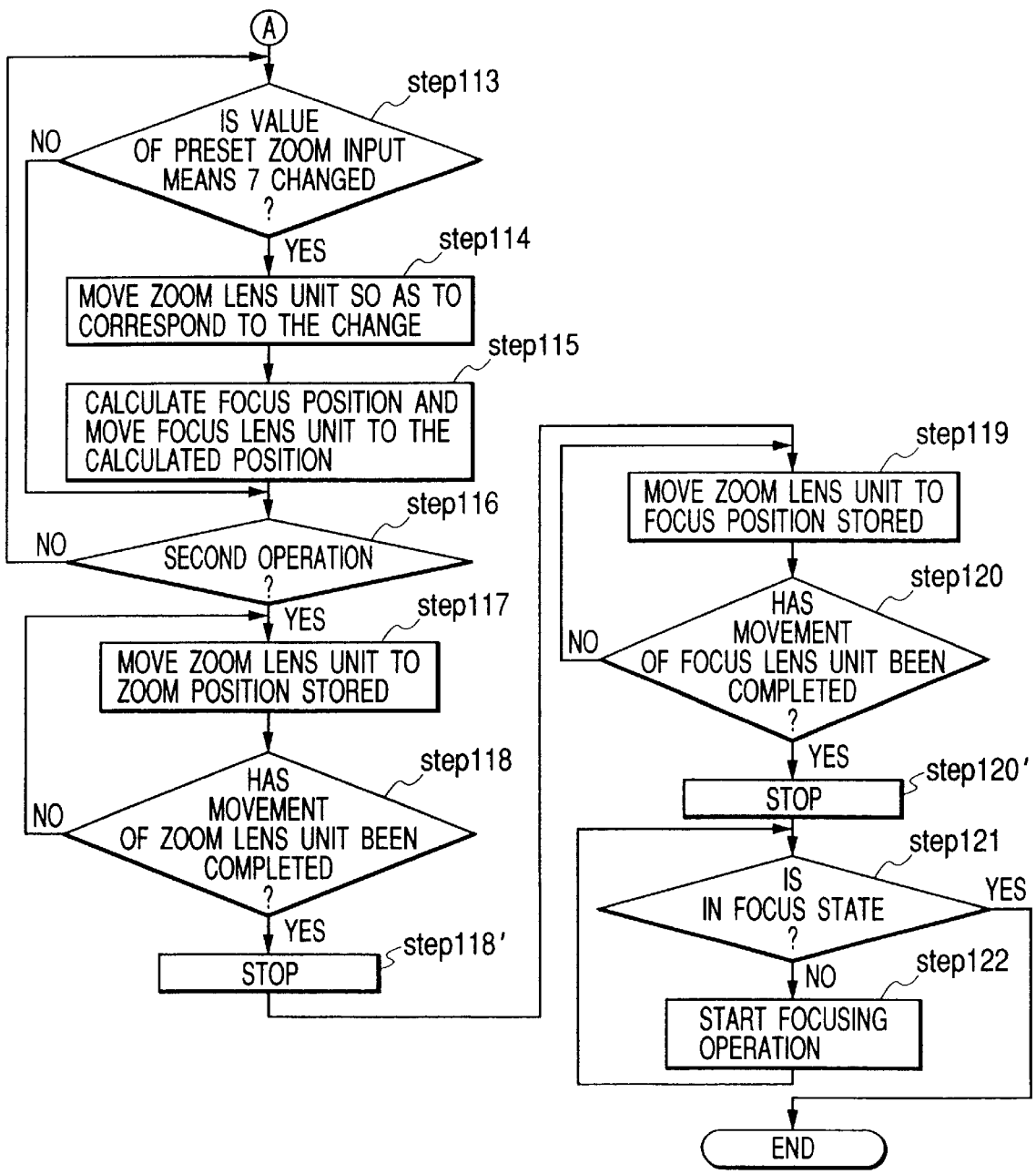

FIGS. 8A and 8B show the flowcharts of the operation in the AF lens apparatus of the present embodiment. In first step 101, the CPU 30 starts the driving of the focus lens unit so as to make the defocus amount equal to zero or within a permissible range, based on a signal from the focal point detection circuit 32.

Then the CPU goes to step 102 to determine whether the in-focus state is achieved, based on the signal from the focal point detection circuit 32. When the in-focus state is not achieved, the CPU continuously carries out step 101. When the in-focus state is achieved, the CPU goes to step 103. In step 103, the CPU 30 determines whether the zoom operation is performed through the zoom control switch 9. When the zoom operation is performed, the CPU proceeds to step 104.

In this step 104, the CPU 30 drives the zoom lens unit 42 at the speed according to the operation of the zoom control switch 9.and in the telephoto/wide-angle direction according to the operation direction and then returns to step 103.

When in step 103 the zoom operation is not performed through the zoom control switch 9, the CPU transfers to step 105. In step 105, the CPU 30 determines the zoom position (target position) to be preset, from the signal from the zoom preset input volume 7.

In next step 106, the CPU 30 determines whether the on operation (first operation) of the zoom start switch 8 is carried out. When the on operation is not carried out, the CPU goes back to step 103. When it is performed, the CPU goes to step 107.

In step 107, the CPU 30 stores the current zoom position detected by the zoom position detector 2, in the internal memory or in the external memory.

Then the CPU goes to step 108 to store the current focus position detected by the focus position detector 31, in the internal memory or in the external memory. Further, the CPU goes to step 109 to move the zoom lens unit 42 at the preset speed to the zoom position preset by the zoom preset input volume 7.

Then the CPU 30 goes to step 110 to determine whether the zoom movement to the preset position is complete, based on the output of the zoom position detector 2. When it is not complete, the CPU continuously performs the zoom driving of step 110. When it is complete, the CPU goes to step 110' to stop the zoom driving and then goes to step 111.

In step 111, the CPU 30 calculates the position of the focus lens unit 45 where the focus lens unit can be in focus, on the assumption that there is no change in the object distance from the distance in the in-focus state in step 102, based on the position of the zoom lens unit 42 moved in step 109. This calculation is desirably carried out by storing a plurality of table data in the memory and carrying out interpolation calculation using the table data. Then the CPU 30 moves the focus lens unit 45, based on the calculated position.

In next step 112, the CPU 30 determines whether the movement of the focus lens unit 45 is complete. When it is not complete, the CPU returns to step 111 to continue the focus movement. When it is complete, the CPU transfers to step 112' to terminate the focus movement and then goes to step 113.

In step 113, the CPU 30 determines whether the preset position is changed through operation of the zoom preset input volume 7. If it is changed, the CPU proceeds to step 114 to move the zoom lens unit 42 according to the change. Then the CPU moves to step 115 to again calculate the focus position corresponding to the change of the zoom preset position and moves the focus lens unit 45 to the calculated position where the focus lens unit can be in focus.

When the movement of the focus lens unit 45 is complete or when the zoom preset input volume 7 is not operated, the CPU moves to step 116.

In step 116, the CPU 30 then determines whether the release (the off operation: second operation) of the on operation of the zoom start switch 8 is carried out. When the release of the on operation is not performed, the CPU returns to step 113. On the other hand, when the release of the on operation of the zoom start switch 8 is performed, the CPU goes to step 117 to move the zoom lens unit 42 to the zoom position stored in step 107.

Then the CPU goes to step 118 to determine whether the movement of the zoom lens unit 42 is complete. When it is not complete, the CPU continuously carries out step 117. When it is complete, the CPU goes to step 118' to terminate the zoom driving and then goes to step 119.

In step 119 the CPU moves the focus lens unit 45 to the focus position stored in step 108. Then the CPU goes to step 120 to determine whether the movement of the focus lens unit 45 is complete. When it is not complete, the CPU continuously carries out step 119. When it is complete, the CPU transfers to step 120' to terminate the focus driving, and then goes to step 121.

In step 121, the CPU determines whether the in-focus state is achieved, based on the signal from the focal point detection circuit 32. When the in-focus state is not achieved, the CPU 30 goes to step 122 to perform the focusing operation again, and then checks the in-focus state in step 121. When the in-focus state is achieved in step 121, the CPU ends the operation.

In the present embodiment, as described above, where the focus position is moved with movement of the zoom lens unit, the CPU 30 stores the real position of the focus lens unit 45 detected by the focus position detector 2 in response to the on operation of the zoom start switch 8 and drives the focus lens unit 45 to the position where the in-focus state is achieved with respect to the zoom lens unit driven to the preset position set by the zoom preset input volume 7. Thereafter, in response to the release of the on operation of the zoom start switch 8, the focus lens unit 45 is then driven to the position stored in response to the above on operation.

Therefore, in addition to the effects similar to those of the first and second embodiments, the present embodiment also presents the following effect: the desired zoom magnification and in-focus state according to movement of the zoom lens unit 42 to the preset position can be obtained by only carrying out the on operation of the zoom start switch 8; and reproduction of the zoom magnification and in-focus state according to the movement of the zoom lens unit to the original position can also be achieved by only carrying out the release of the on operation of the zoom start switch 8. The present embodiment can realize an easy-to-handle camera system accordingly.

(Fourth Embodiment)

Figure 9A:
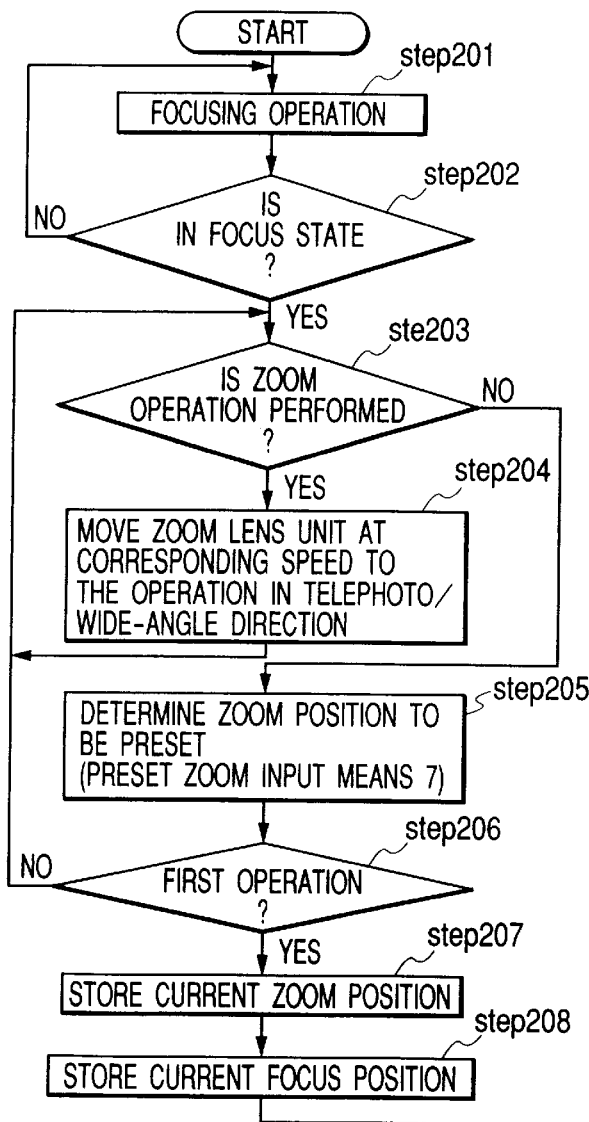
FIG. 9 which is composed of FIGS. 9A and 9B are flowcharts to show the operation of the zoom lens apparatus of the fourth embodiment of the present invention.
Figure 9:
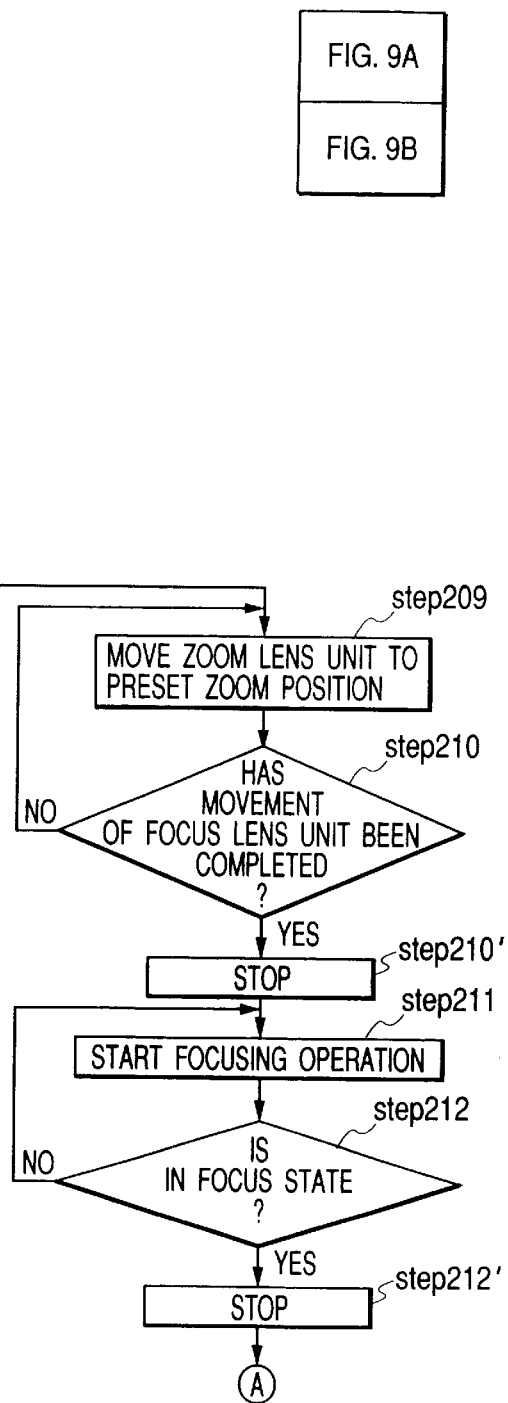
Figure 9B:
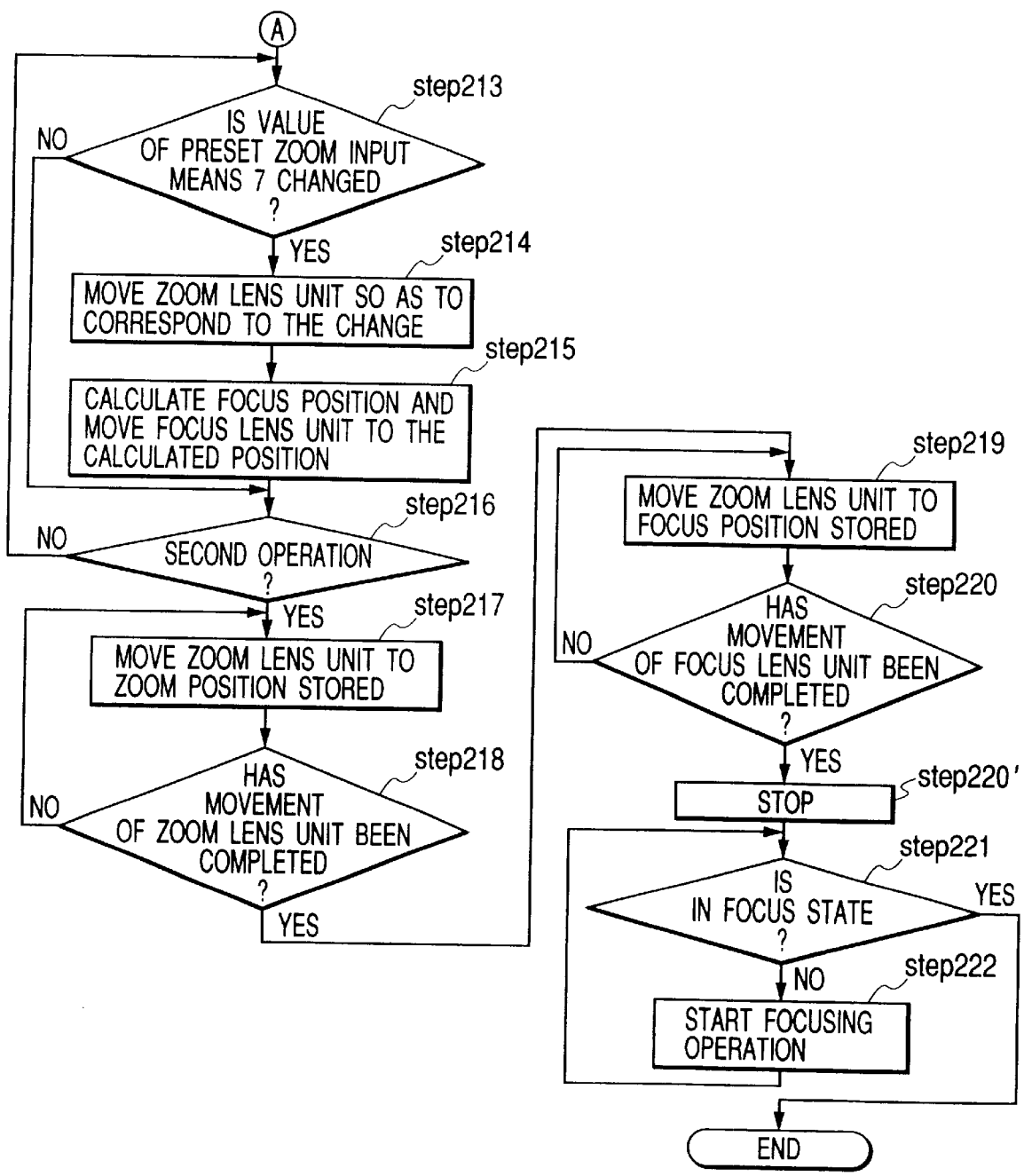

FIGS. 9A and 9B show the flowcharts of the operation of the rear focus type AF lens apparatus which is the fourth embodiment of the present invention. Step 201 to step 210' and step 212' to step 222 in the present flow are the same as step 101 to step 110' and step 112' to step 122, respectively, in the third embodiment.

In the above third embodiment, since the object distance varies when the zoom lens unit 42 is moved to the zoom position preset by the zoom preset input volume 7 to photograph an object different from that heretofore, the focus position corresponding to the zoom position after the movement is calculated in step 111 and step 112 and the focus lens unit is moved to this calculated position; whereas in the present embodiment step 211 and step 212 are configured to move the focus lens unit 45 while monitoring the in-focus state through the focal point detection circuit 32.

Each of the above embodiments was the example making use of the volume resistor as the preset input means, but digital data may also be inputted through operation of up-down switches or ten keys. Further, the apparatus may also be structured to set the preset position in stepless manner or in stepwise manner through the volume resistor, the up-down switches, or the like.

(Fifth Embodiment)

Figure 11:
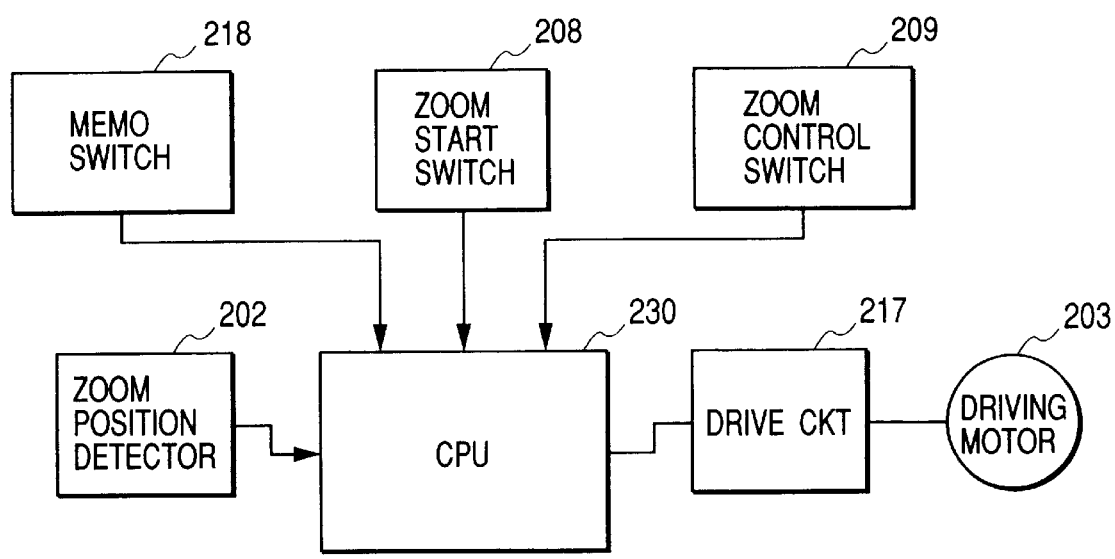
FIG. 11 is a block diagram to show an electric circuit in the zoom lens apparatus of the fifth embodiment.

FIG. 10 and FIG. 11 show the structure of the zoom lens apparatus which is the fifth embodiment of the present invention. This zoom lens apparatus is mounted on the TV camera or on the video camera of the carrying type.

In this figure, reference numeral 201 designates the main body of the zoom lens apparatus, which accommodates the zoom lens unit, the focus lens unit, the iris unit (neither of which is illustrated), and so on.

Numeral 203 denotes a driving motor for driving the zoom lens unit and a motor idler gear 205 is attached to an output shaft of this driving motor 203. This motor idler gear 205 is in mesh with the peripheral gear part of a zoom driving ring 201a mounted so as to be rotatable about the optical axis relative to the main body 201. Therefore, with rotation of the motor 203, the rotation is transmitted through the motor idler gear 205 and zoom driving ring 201a to the zoom driving mechanism (not illustrated) interlocked with the zoom driving ring 201a. This causes the zoom lens unit to move along the optical axis in the main body 201.

A detection idler gear 204 is in mesh with the peripheral gear part of the zoom driving ring 201a and this detection idler gear 204 is attached to a shaft part of zoom position detector 202. The zoom position detector 202 is comprised of an encoder, a potentiometer, or the like and the shaft part thereof rotates in conjunction with the rotation of the zoom driving ring 201a, whereby the detector 202 outputs an electric signal according to the rotational position of the zoom driving ring 201a, i.e., the current position (real position) between the wide-angle extreme and the telephoto extreme of the zoom lens unit.

The zoom position detector may also be a detector that outputs a signal indicating an absolute position of the zoom lens unit, depending upon how far the zoom lens unit is located from a specific reset position.

Numeral 230 represents a CPU for controlling this zoom lens apparatus. Numeral 218 represents a MEMO switch (preset input means) which, when the operator performs the on operation, stores and sets the real position of the zoom lens unit detected by the zoom position detector 202 at the time of this on operation, as a preset position (target position). Numeral 208 denotes a zoom start switch (operation means) operated by the operator, for starting driving of the zoom lens unit.

Numeral 209 stands for a zoom control switch (an operation member for lens control) for permitting the operator to enter a control signal as a command of a driving direction and a driving speed (which may be replaced by a driving amount or a driving position) for servo driving of the zoom lens unit by operating it. The zoom control switch 209 is a switch that outputs a signal according to its operation direction and operation speed and that is comprised of a seesaw switch, a slide switch, an up-down switch, a rotary volume, or the like enabling variation of speed, depending upon depressing force. In another potential configuration, the operator is allowed to enter the driving speed and the driving direction through respective switches separated from each other.

Numeral 217 designates a driving circuit for driving the zoom driving motor 203. The CPU 230, motor 203, and driving circuit 217 compose the drive control means stated in the claims.

Figure 12:
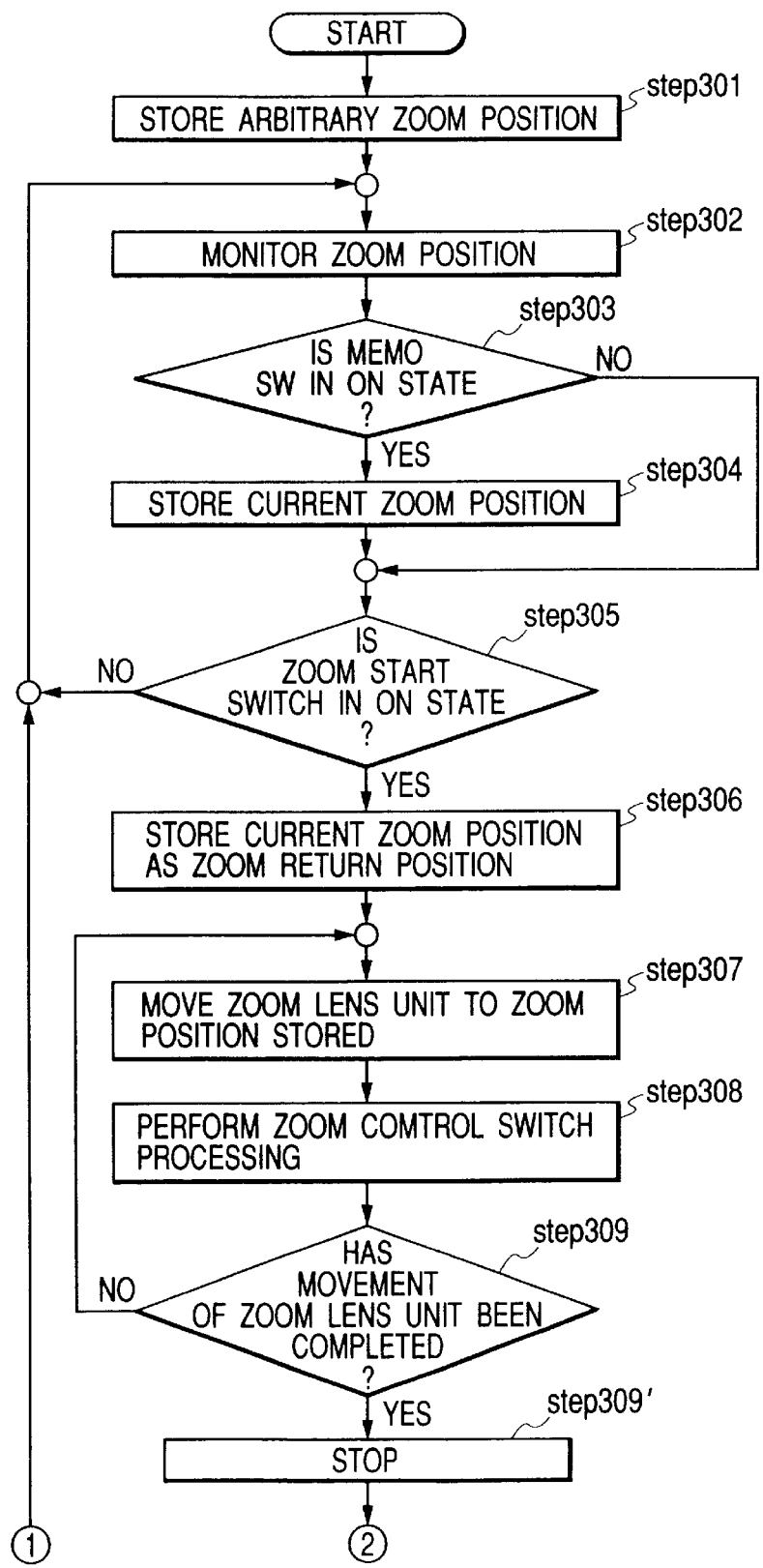
FIG. 12 is a flowchart to show the operation of the zoom lens apparatus of the fifth embodiment.

In the present embodiment the zoom preset and return function is implemented by the software structure using the CPU 230. FIG. 12, FIG. 13, and FIG. 14 show the flowchart of the operation of the zoom lens apparatus of the present embodiment.

First, in step 301 the CPU 230 stores an arbitrary zoom position in the internal or external memory, as initial setting, upon on of power of the lens apparatus. This position can be the zoom position upon on of power or a zoom position desired by the user.

After this, since the operator moves the zoom lens unit to a desired position (a position to be stored) by servo driving through manual operation of the zoom driving ring 201a or through operation of the zoom control switch 209, the CPU monitors the real position of the zoom lens unit through the zoom position detector 202 in step 302.

Then the CPU goes to step 303 to determine whether the MEMO switch 218 is switched on. When the on operation is not performed yet (or when the MEMO switch still remains off), the CPU moves from step 303 to step 305. In this case, the initial position stored in step 301 is not updated.

On the other hand, when the MEMO switch 218 is switched on, the CPU proceeds to step 304. In step 304, the CPU 230 stores the zoom position (the current zoom position) detected by the zoom position detector 202 at the time of the on operation, as a preset position in the memory, and then goes to step 305. After this, the operator manipulates the zoom control switch 209 and the photography is carried out while moving the zoom lens unit in accordance therewith.

In step 305, the CPU determines whether the on operation (first operation) of the zoom start switch 208 is carried out. When the on operation is not carried out yet, the CPU goes back to step 302. When it is performed, the CPU goes to step 306.

In step 306, the CPU 230 stores the zoom position (current zoom position: which will be referred to hereinafter as a zoom return position) detected by the zoom position detector 202 at the time of execution of the on operation of the zoom start switch 208, into the memory. Further, the CPU goes to step 307 to drive the zoom lens unit at the predetermined speed to the zoom position stored in step 304.

The zoom position stored in the memory will not be updated even if the MEMO switch 218 is switched on during this driving of the zoom lens unit.

Then the CPU proceeds to step 308 to perform zoom control switch processing. FIG. 14 is the flowchart of the zoom control switch processing. In this zoom control switch processing, the CPU executes step 317 to determine whether the zoom control switch 209 is operated. When it is not operated, the CPU terminates the zoom control switch processing and goes to step 309.

On the other hand, when the zoom control switch 209 is operated, the CPU goes to step 318 to move the zoom lens unit in accordance with the operation of the zoom control switch 209. Then the CPU proceeds to step 319 to determine whether the operation of the zoom control switch 209 is complete. When it is not complete, the CPU goes back to step 318. When it is complete, the CPU terminates the zoom control switch processing and goes to step 309.

In step 309, the CPU 230 determines, based on the output of the zoom position detector 202, whether the movement of the zoom lens unit to the preset position stored in step 304 is complete. When it is not complete, the CPU continuously performs the zoom driving of step 307. If it is complete, the CPU goes to step 309' to stop the zoom driving.

When the movement of the zoom lens unit to the preset position is complete, the CPU goes to step 310 to determine whether the release (the off operation: second operation) of the on operation of the zoom start switch 208 is performed. When the release of the on operation of the zoom start switch 208 is not performed yet, the CPU goes to step 311 to perform the same zoom control switch processing as the aforementioned processing. When it is complete, the CPU returns to step 310.

On the other hand, when the release of the on operation of the zoom start switch 208 is performed, the CPU goes to step 312 to move the zoom lens unit at the preset speed to the zoom return position stored in step 306.

When the MEMO switch 218 is switched on during this return movement of the zoom lens unit (step 313), the CPU 230 stores the current zoom position detected by the zoom position detector 202, as a new preset position (step 314), as in step 304. When the MEMO switch 218 is not switched on during the return movement of the zoom lens unit, the CUP goes to step 315. In step 315 the CPU performs the zoom control switch processing and, after completion of this processing, the CPU goes to step 316.

In step 316, the CPU 230 determines, based on the output of the zoom position detector 202, whether the movement of the zoom lens unit to the zoom return position is complete. When it is not complete, the CPU returns to step 312. When it is complete, the CPU goes to step 316' to terminate the zoom driving and then returns to step 302.

In the present embodiment, as described above, with execution of the on operation of the zoom start switch 208, the CPU 230 stores the position of the zoom lens unit at that time (the zoom return position: so to speak, the first preset position) and the zoom lens unit is driven to the preset position (so to speak, the second preset position) preliminarily set by the on operation of the MEMO switch 218, thereby enabling the photography at the zoom magnification corresponding to the preset position. With the release of the on operation of the zoom start switch 208 thereafter, the zoom lens unit is driven to the original position stored by the CPU 230, thus enabling the photography at the original zoom magnification.

Therefore, the present embodiment also necessitates only one zoom start switch 208 and one MEMO switch 218 as elements to be operated by the operator in order to implement the movement of the zoom lens unit between the two preset positions. This permits these zoom start switch 208 and MEMO switch 218 to be disposed on the main body of the lens apparatus. Therefore, the present embodiment obviates the necessity for carrying the large and extra external device such as the conventional preset box, and can improve the carryability of the entire camera system consisting of the zoom lens apparatus and the camera.

In addition, since the zoom position stored in the CPU 230 is the position that the operator determined while watching the viewer, the finder, or the like provided in the TV camera, there is no need for such cumbersome and difficult work as to match the position of the volume with the zoom position on the viewer or the finder. Therefore, the apparatus of the present embodiment can be an easy-to-handle zoom lens apparatus.

Since the present embodiment also assures accurate return of the zoom position to the position stored in the CPU 230 with the release of the on operation of the zoom start switch 208, perfect reproducibility can be achieved for the zoom position.

In the above embodiment, where the preset zoom position is a zoom position on the telephoto side and the cameraman adjusts the focus lens to the in-focus position at the zoom position and thereafter performs the second operation, the good in-focus state can be maintained throughout the entire region from the wide-angle extreme to the telephoto extreme.

In the present embodiment the MEMO switch 218 was described as one switch, but the apparatus may also be constructed in such structure that a set of switches (for example, two switches) are provided as MEMO switches, that the preset position can be stored only in the case of simultaneous activation of the switches, and that storage of the preset position is not executed when only one MEMO switch is erroneously switched on.

(Sixth Embodiment)

Figure 15:
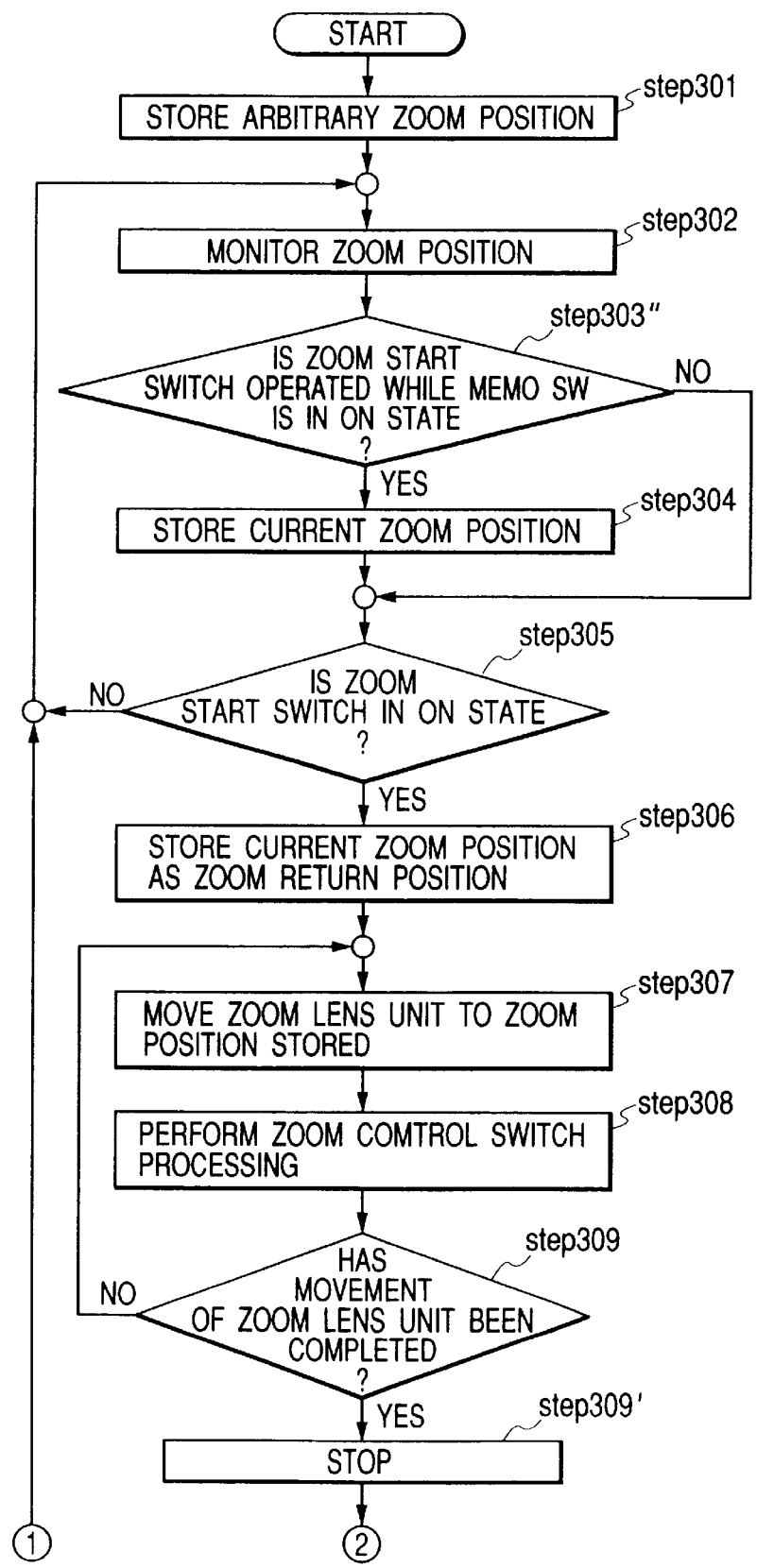
FIG. 15 is a flowchart to show the operation of the zoom lens apparatus of the sixth embodiment of the present invention.
Figure 16:
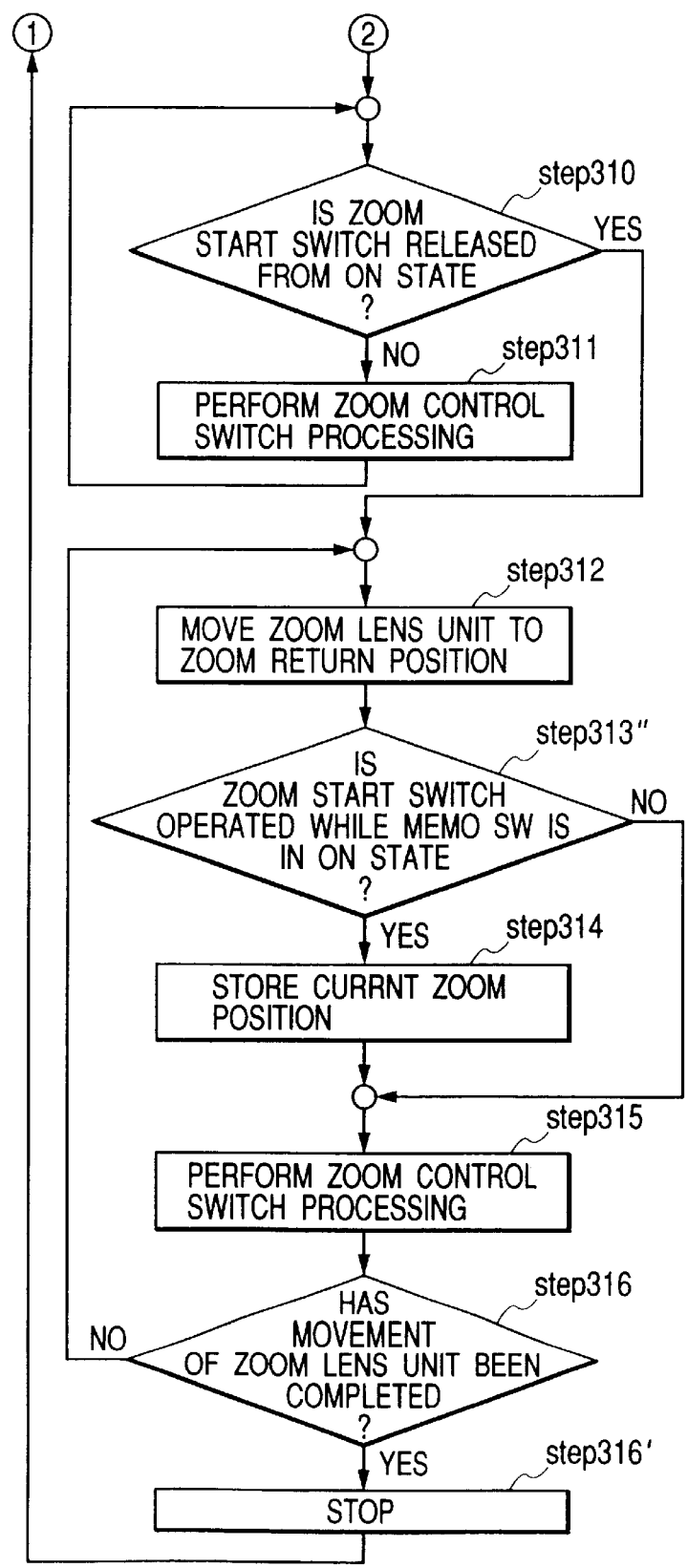
FIG. 16 is a flowchart to show the operation of the zoom lens apparatus of the sixth embodiment of the present invention.

The above fifth embodiment was described as the example in which the preset position was stored and set by only the on operation of the MEMO switch 218, but the apparatus may also be structured to store and set the preset position by the on operation (first operation) of the zoom start switch 208 in the on state of the MEMO switch 218 or at the same time as this on operation, as in step 303" and step 313" of the flowchart illustrated in FIG. 15 and FIG. 16.

This can prevent the preset position from being set when the operator erroneously performs the on operation of the MEMO switch 218.

The contents of the steps except for step 303" and step 313" in the flowchart illustrated in FIG. 15 and FIG. 16 are the same as in the flowchart of FIG. 12 to FIG. 14.

In the present embodiment the MEMO switch 218 was described as one switch, but the apparatus may also be constructed in such structure that a set of switches (for example, two switches) are provided as MEMO switches and that the preset position can be stored only when these switches are simultaneously switched on and when the zoom start switch 208 is further switched on, thereby preventing the preset position more surely from being stored by erroneous operation.

(Seventh Embodiment)

In the above fifth embodiment, when the zoom control switch 209 is operated (step 315) before arrival of the zoom lens unit at the zoom return position after the release of the on operation of the zoom start switch 208 (step 310), the zoom lens unit moves according to the operation of the zoom control switch 209 (step 318) and the zoom lens unit moves to the zoom return position after completion of the operation of the zoom control switch 209.

In this control, however, the zoom lens unit moves even after completion of the operation of the zoom control switch 209, and the operator can feel somewhat odd.

As countermeasures against it, the apparatus may also be structured to update the zoom return position previously stored in response to the on operation of the zoom start switch 208 to the zoom position detected by the zoom position detector 202 at the time of completion of the operation of the zoom control switch 209 when the zoom control switch 209 is operated after the release of the on operation of the zoom start switch 208 and before the arrival of the zoom lens unit at the zoom return position.

According to this structure, the zoom lens unit reaches the zoom return position thus updated, at the time of completion of the operation of the zoom control switch 209 and the driving of the zoom lens unit is stopped at this point. Therefore, the operator can be prevented from feeling odd as described above.

The structure described in each of the above embodiments can be applied to the zoom lens apparatus integrally having the zoom lens apparatus body, the preset input means, the operation means, and the drive control means, and can also be applied to lens drive units which are provided with the preset input means, operation means, and drive control means and which are mounted on or connected to the zoom lens apparatus body, to drive and control the lens units in the zoom lens apparatus body.

The zoom lens apparatus mounted on the TV cameras etc. of the carrying type were described in each of the above embodiments, but the present invention can also be applied to the zoom lens apparatus mounted on the TV cameras etc. of the studio installed type. In this case, the zoom control switch 9, 209 is replaced by a zoom demand (operation member for control of lens) for giving a command of driving direction, driving amount, driving position, or driving speed or the like of the zoom lens unit and, for example, the zoom start switch 8, 208 and the zoom preset input volume 7 or the MEMO switch 218 are placed in a lens control unit to which the zoom demand is connected or mounted.

In this case, since the start switch 8, 208 and the zoom preset input volume 7 or the MEMO switch 218 are located in the lens control unit used heretofore, the external device such as the preset box or the like does not have to be used, either.

Each of the above embodiments was described as the example in which the dedicated zoom start switch 8, 208 was provided for execution of the zoom preset operation, but this function of the switch 8, 208 can be added to the zoom control switch 9, 209, thereby obviating the need for the zoom start switch 8, 208. In this case, for example, a switch or the like for permitting the operator to perform a mode changeover operation is connected to the control unit 6 of the first embodiment or to the CPU 30 or 230 of the second to seventh embodiments, and the CPU 30, 230, etc. performs selective operation in either of a normal operation mode in which the zoom lens unit is driven to the position corresponding to the normal operation of the zoom control switch 9, 209 and a preset mode in which the preset operation is carried out by the operation (first operation) and release (second operation) of the operation of the zoom control switch 9, 209, or by the operation on the preset position or zoom target position side when seen from the original zoom position (the first operation, for example, wide-angle zoom operation) and the operation on the original position side (the second operation, for example, telephoto zoom operation).

Further, each of the above embodiments was described as the example in which the zoom preset operation is carried out in response to the on operation (first operation) and the release thereof (second operation) of the zoom start switch 8, 208 provided as the operation means, but the apparatus may also be constructed, for example, in such structure that the apparatus is provided with a set of operation means including a switch for moving the zoom lens unit to the preset position set by the zoom preset input volume 7 or by the MEMO switch 218 and a switch for moving the zoom lens unit to the original position and that the zoom preset operation is carried out based on the on operations (first and second operations) of the respective switches.

Each of the above embodiments was described as the example in which the zoom lens unit underwent the preset operation, but the present invention can also be applied to the cases wherein the focus lens unit undergoes the preset operation.

Figure 17:
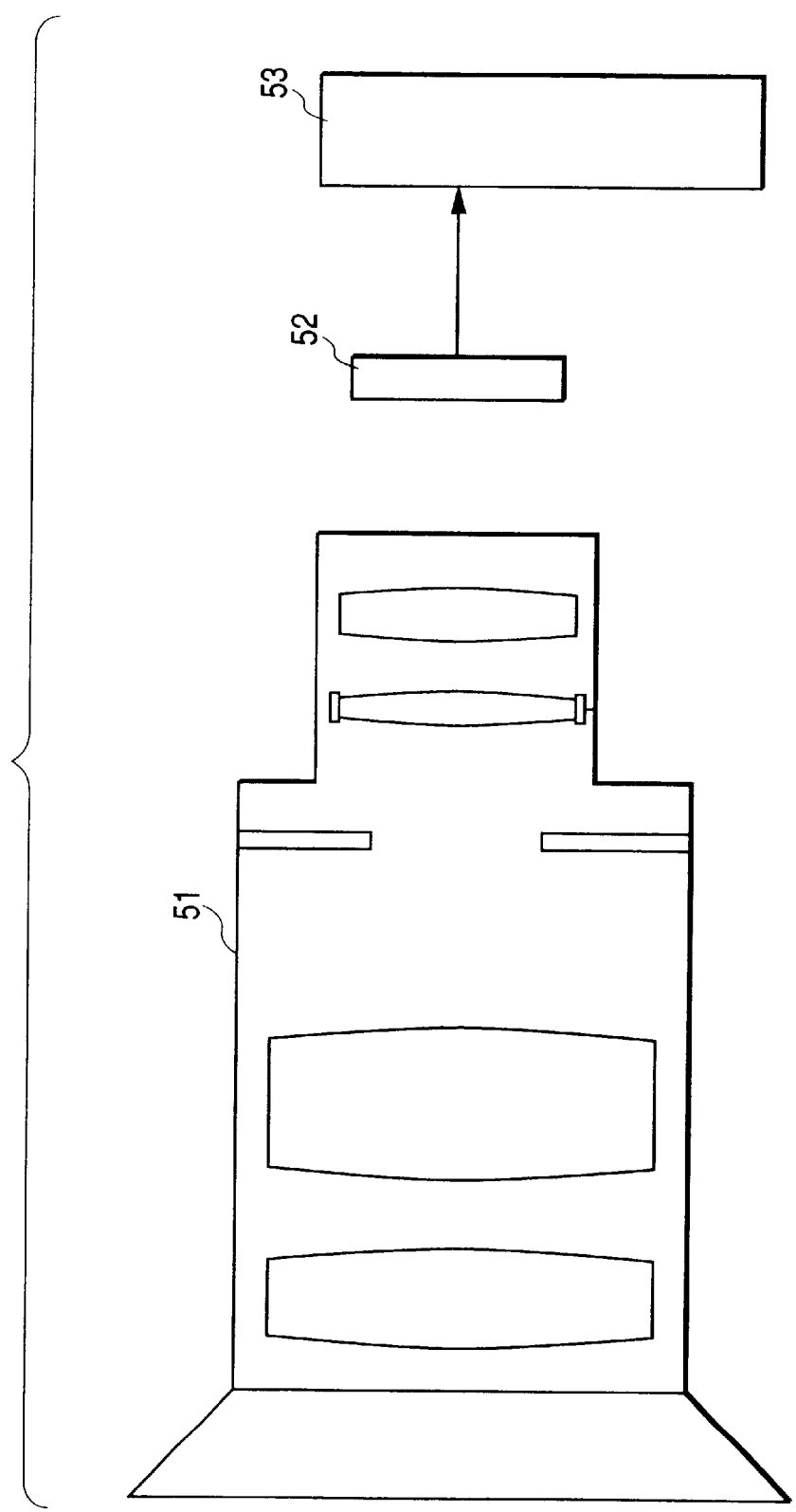
FIG. 17 is a schematic diagram of a photographing system according to the present invention.
Figure 18:
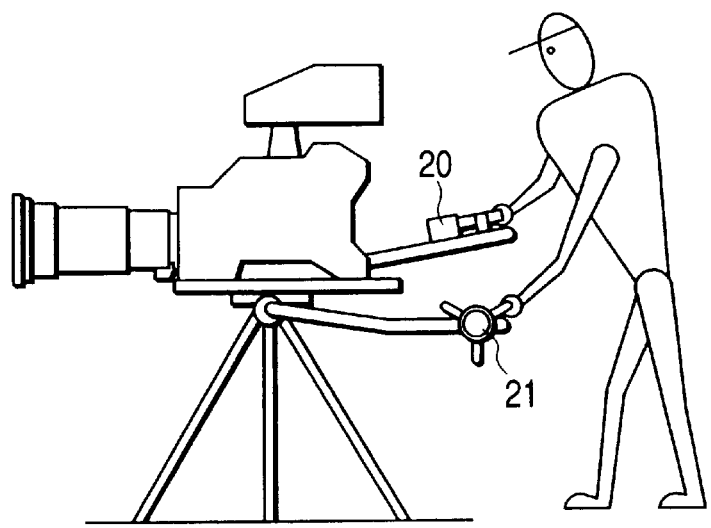
FIG. 18 is a schematic diagram to show the structure of the conventional TV camera system.
Figure 19:
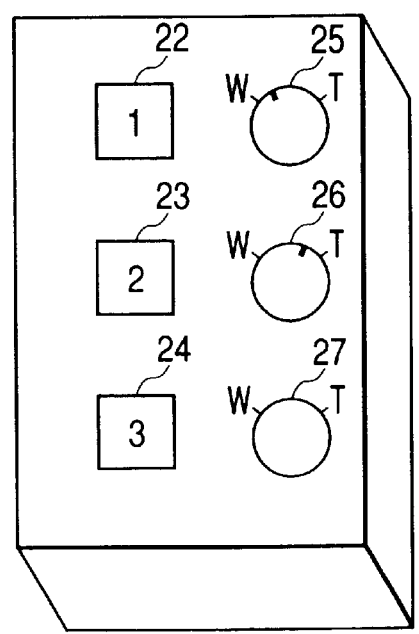
FIG. 19 is a schematic diagram of the preset box used heretofore.

An advanced photographing system can be provided by mounting the lens apparatus 51 as described above on the camera provided with photoelectric conversion means 52 or the like such as CCD or the like, as illustrated in FIG. 17.

As described above, the optical apparatus according to the first aspect of the present invention is constructed in such structure that with execution of the first operation of the operation means, the lens position at that time (so to speak, the first preset position) is stored, that the lens unit is driven to the preset position (the second preset position) preliminarily set by the preset input means to permit photography thereat, and that with execution of the second operation of the same operation means thereafter, the lens unit is driven to the above first preset position (the original position) to permit photography thereat. Therefore, when the present invention is applied, there are only one operation means and one operation preset input means necessary for the movement of the lens unit between the two preset positions and these means can be placed on the lens apparatus body or on the lens driving unit, used heretofore, equipped with the zoom demand or the like. Therefore, the present invention can obviate the need for carrying the preset box as the large and extra external device used before and can achieve the improvement in the carryability of the entire photographing system consisting of the optical apparatus (or the optical apparatus body and the optical driving unit) and the camera.

In addition, with execution of the first operation of the operation means, the lens position at that time is stored, and the lens unit is returned surely to the stored position, with execution of the second operation; therefore, perfect reproducibility can be achieved for the lens-position.

The optical apparatus according to the second aspect of the present invention is constructed in the structure wherein, in the case of the focus movement occurring with movement of the zoom lens unit, the real position of the focus lens unit detected by the focus position detecting means is stored in response to the first operation of the operation means and the focus lens unit is driven to the position where the in-focus state is achieved with respect to the zoom lens unit driven to the target position set by the preset input means. Then, in response to the second operation of the operation means, the focus lens unit is driven to the position where the in-focus state is achieved with respect to the zoom lens unit returning to the stored position in response to the first operation, i.e., to the original position. Therefore, according to the present invention, the desired zoom magnification and in-focus state according to the movement of the zoom lens unit to the preset position can be achieved by only carrying out the first operation of the operation means, and reproduction of the zoom magnification and the in-focus state according to the movement of the zoom lens unit to the original position can be achieved by only carrying out the second operation. The present invention thus realizes the optical apparatus (or, the optical apparatus body and the optical driving unit) and the photographing system with good operability as to the zoom reset and return function.

What is claimed is:

1. An optical apparatus comprising:
   operation means for permitting a first operation and a second operation;
   position detecting means for detecting a position of an optical element;
   target position setting means for permitting arbitrary setting of a target position in driving of said optical element after occurrence of the first operation by the operation means; and
   control means for controlling the driving of said optical element,
   wherein said control means stores the position of said optical element detected by said position detecting means and drives said optical element to the target position set by said target position setting means, in response to the first operation of said operation means, and said control means drives said optical element to the stored position of said optical element detected by said position detecting means, in response to the second operation of said operation means.

2. The optical apparatus of claim 1, wherein said second operation is release of said first operation.

3. The optical apparatus of claim 1, wherein when said control means drives said optical element to the target position set by said target position setting means, in response to said first operation, and when the target position is changed to another target position by said target position setting means without execution of said second operation, said control means drives said optical element to the target position after the change.

4. The optical apparatus of claim 1, wherein said optical element is a lens unit having zooming action.

5. The optical apparatus of claim 4, said optical apparatus comprising a lens unit having focusing action, in addition to the lens unit having said zooming action, wherein said lens unit having the zooming action is located at a position closer to the image plane than said lens unit having the focusing action.

6. The optical apparatus of claim 4, said optical apparatus comprising a lens unit having focusing action, in addition to the lens unit having said zooming action, wherein said lens unit having the focusing action is located at a position closer to the image plane than said lens unit having the zooming action.

7. The optical apparatus of claim 4, said optical apparatus comprising:
   a lens unit having focusing action, in addition to the lens unit having said zooming action; and
   focusing lens position detecting means for detecting a position of said lens unit having the focusing action,
   wherein said control means stores the position of said lens unit having the focusing action, detected by said focusing lens position detecting means, and drives said lens unit having the focusing action to a position where an in-focus state is achieved with respect to said lens unit having the zooming action, driven to the target position, in response to said first operation, and said control means drives said lens unit having the focusing action to the stored position of said lens unit having the focusing action, detected by said focusing lens position detecting means, in response to said second operation.

8. The optical apparatus of claim 7, wherein said control means calculates a position of said lens unit having the focusing action where the in-focus state is achieved, in response to said first operation, and drives said lens unit having the focusing action to the position thus calculated.

9. The optical apparatus of claim 7, said optical apparatus comprising focus detecting means for detecting a focus state,
wherein, in response to said first operation, said control means drives said lens unit having the focusing action until said focus detecting means detects the in-focus state.

10. The optical apparatus of claim 1, wherein said target position setting means comprises a volume for variably outputting an electric signal corresponding to the target position of said optical element.

11. The optical apparatus of claim 1, wherein said target position setting means can set the target position of said optical element on a stepless basis.

12. The optical apparatus of claim 1, wherein said target position setting means can set the target position of said optical element on a stepwise basis.

13. The optical apparatus of claim 1, wherein said target position setting means comprises an on/off switch and wherein when said switch is switched on, said target position setting means sets a position of said optical element detected at the time of on by said position detecting means, as the target position.

14. The optical apparatus of claim 13, wherein said target position setting means comprises a plurality of on/off switches and wherein when said plurality of switches all are switched on, said target position setting means sets a position of said optical element detected at the time of on by said position detecting means, as the target position.

15. The optical apparatus of claim 13, wherein when said target position setting means is switched on and when said first operation is performed, said target position setting means sets a position of said optical element detected at this time by said position detecting means, as the target position.

16. The optical apparatus of claim 15, wherein when the on operation of said target position setting means and said first operation are carried out simultaneously, said target position setting means sets a position of said optical element detected at this time by said position detecting means, as the target position.

17. The optical apparatus of claim 1, said optical apparatus comprising a control unit provided with an operation member for control in order to give a command of a driving direction, a driving amount, a driving position, or a driving speed of said optical element,
wherein said operation means and said target position setting means are mounted on said control unit.

18. The optical apparatus of claim 1, said optical apparatus comprising an operation member for control in order to give a command of a driving direction, a driving amount, a driving position, or a driving speed of said optical element,
wherein when said operation member for control is operated after execution of said second operation and before arrival of said optical element at the position stored in response to said first operation, said control means stores a position of said optical element at the time of completion of the operation of said operation member for control, in place of the position stored in response to said first operation.

19. The optical apparatus of claim 1, wherein said operation means comprises a switch for starting the driving of said optical element.

20. The optical apparatus of claim 1, wherein said position detecting means outputs an electric signal according to a current position of said optical element.

21. The optical apparatus of claim 1, wherein said control means comprises an electric circuit.

22. The optical apparatus of claim 1, wherein said control means comprises a CPU.

23. The optical apparatus of claim 1, said optical apparatus being a lens apparatus comprising a lens unit having zooming action, a lens unit having focusing action, and a stop.

24. An optical element driving unit, mounted on or connected to an optical apparatus body, for driving and controlling an optical element in said optical apparatus body, said optical element driving unit comprising:
operation means for permitting a first operation and a second operation;
position detecting means for detecting a position of said optical element;
target position setting means for permitting arbitrary setting of a target position in driving of said optical element after occurrence of the first operation by the operation means; and
control means for controlling the driving of said optical element,
wherein said control means stores the position of said optical element detected by said position detecting means and drives said optical element to the target position set by said target position setting means, in response to the first operation of said operation means, and said control means drives said optical element to the stored position of said optical element detected by said position detecting means, in response to the second operation of said operation means.

25. The optical element driving unit of claim 24, wherein said second operation is release of said first operation.

26. The optical element driving unit of claim 24, wherein when said control means drives said optical element to the target position set by said target position setting means, in response to said first operation, and when the target position is changed to another target position by said target position setting means without execution of said second operation, said control means drives said optical element to the target position after the change.

27. The optical element driving unit of claim 24, wherein said optical element is a lens unit having zooming action, and
wherein said control means drives said lens unit having the zooming action in said optical apparatus body.

28. The optical element driving unit of claim 27, said optical element driving unit comprising focusing lens position detecting means for detecting a position of a lens unit having focusing action in said optical apparatus,
wherein said control means stores the position of said lens unit having the focusing action, detected by said focusing lens position detecting means, and drives said lens unit having the focusing action to a position where an in-focus state is achieved with respect to said lens unit having the zooming action, driven to the target position, in response to said first operation, and said control means drives said lens unit having the focusing action to the stored position of said lens unit having the focusing action, detected by said focusing lens position detecting means, in response to said second operation.

29. The optical element driving unit of claim 24, wherein said target position setting means comprises a volume for variably outputting an electric signal corresponding to the target position of said optical element.

30. The optical element driving unit of claim 24, wherein said target position setting means comprises an on/off switch and wherein when said switch is switched on, said target position setting means sets a position of said optical element detected at the time of on by said position detecting means, as the target position.

31. The optical element driving unit of claim 24, said optical element driving unit comprising an operation member for control in order to give a command of a driving direction, a driving amount, a driving position, or a driving speed of said optical element, wherein when said operation member for control is operated after execution of said second operation and before arrival of said optical element at the position stored in response to said first operation, said control means stores a position of said optical element at the time of completion of the operation of said operation member for control, in place of the position stored in response to said first operation.

32. The optical element driving unit of claim 24, said optical element driving unit being a lens driving unit for driving a lens unit having zooming action and a lens unit having focusing action.

33. A photographing system comprising an optical apparatus, said photographing system comprising:

operation means for permitting a first operation and a second operation;

position detecting means for detecting a position of an optical element;

target position setting means for permitting arbitrary setting of a target position in driving of said optical element after occurrence of the first operation by the operation means;

control means for controlling the driving of said optical element; and photoelectric conversion means for converting light from an optical system of said optical apparatus to an electric signal, wherein said control means stores the position of said optical element detected by said position detecting means and drives said optical element to the target position set by said target position setting means, in response to the first operation of said operation means, and said control means drives said optical element to the stored position of said optical element detected by said position detecting means, in response to the second operation of said operation means.

34. The photographing system of claim 33, wherein said second operation is release of said first operation.

35. The photographing system of claim 33, wherein when said control means drives said optical element to the target position set by said target position setting means, in response to said first operation, and when the target position is changed to another target position by said target position setting means without execution of said second operation, said control means drives said optical element to the target position after the change.

36. The photographing system of claim 33, wherein said optical element is a lens unit having zooming action, and wherein said control means drives said lens unit having the zooming action in said optical apparatus.

37. The photographing system of claim 36, said photographing system comprising focusing lens position detecting means for detecting a position of a lens unit having focusing action in said optical apparatus, wherein said control means stores the position of said lens unit having the focusing action, detected by said focusing lens position detecting means, and drives said lens unit having the focusing action to a position where an in-focus state is achieved with respect to said lens unit having the zooming action, driven to the target position, in response to said first operation, and said control means drives said lens unit having the focusing action to the stored position of said lens unit having the focusing action, detected by said focusing lens position detecting means, in response to said second operation.

38. The photographing system of claim 33, wherein said target position setting means comprises a volume for variably outputting an electric signal corresponding to the target position of said optical element.

39. The photographing system of claim 33, wherein said target position setting means comprises an on/off switch and wherein when said switch is switched on, said target position setting means sets a position of said optical element detected at the time of on by said position detecting means, as the target position.

40. The photographing system of claim 33, said photographing system comprising an operation member for control in order to give a command of a driving direction, a driving amount, a driving position, or a driving speed of said optical element, wherein when said operation member for control is operated after execution of said second operation and before arrival of said optical element at the position stored in response to said first operation, said control means stores a position of said optical element at the time of completion of the operation of said operation member for control, in place of the position stored in response to said first operation.

41. An optical apparatus comprising:

a zoom lens system including a zoom lens unit adapted to move in an optical axis direction;

a zoom position sensor for detecting a position of said zoom lens unit on the optical axis;

a switch for retaining an ON state by a first operation and retaining an OFF state by a second operation, which is release of said first operation;

a preset volume for arbitrary setting a zoom target position of said zoom lens unit; and a controller for controlling movement of said zoom lens unit on the optical axis, wherein said controller stores a zoom position of said zoom lens unit detected by said zoom position sensor and causes said zoom lens unit to move to said zoom target position set by said preset volume when said first operation is performed in said switch, and said controller causes said zoom lens unit to move to the stored zoom position when said second operation is performed in said switch.

42. An optical apparatus comprising:

a zoom lens system including a zoom lens unit adapted to move in an optical axis direction to perform a zooming action, and a focusing lens unit disposed at an image plane side of said zoom lens unit and adapted to move in the optical axis direction to perform a focusing adjustment;

a zoom position sensor for detecting a position of said zoom lens unit on the optical axis;

a focusing position sensor for detecting a position of said focusing lens unit on the optical axis;

a memory in which a focusing position of said focusing lens unit at which an in-focus state is maintained in each said zoom positions of said zoom lens unit is stored;

a switch for retaining an ON state by a first operation and retaining an OFF state by a second operation, which is release of said first operation;

a preset volume for arbitrary setting a zoom target position of said zoom lens unit; and a controller for controlling movement of said zoom lens unit and said focusing lens unit on the optical axis, wherein said controller stores a zoom position of said zoom lens unit detected by said zoom position sensor and a focus position of said focusing lens unit detected by said focusing position sensor, causes said zoom lens unit to move to said zoom target position set by said preset volume, and causes said focusing lens unit to move to a focus position corresponding to said zoom target position based on information stored in said memory when said first operation is performed in said switch, and said controller causes said zoom lens unit to move to the stored zoom position and causes said focusing lens unit to move to the stored focus position when said second operation is performed in said switch.

43. An optical apparatus comprising:

a zoom lens system including a zoom lens unit adapted to move in an optical axis direction to perform a zooming action, and a focusing lens unit disposed at an image plane side of said zoom lens unit and adapted to move in the optical axis direction to perform focusing adjustment;

a focusing detector for detecting a focus state of an image formed by said zoom lens system;

a zoom position sensor for detecting a position of said zoom lens unit on the optical axis direction;

a focusing position sensor for detecting a position of said focusing lens unit on the optical axis;

a memory in which a focus position of said focusing lens unit at which an in focus state is maintained in each of said zoom positions of said zoom lens unit is stored;

a switch for retaining an ON state by a first operation and retaining an OFF state by a second operation, which is release of said first operation;

a preset volume for arbitrary setting a zoom target position of said zoom lens unit; and a controller for controlling movements of said zoom lens unit and said focusing lens unit on the optical axis, wherein said controller stores a zoom position of said zoom lens unit detected by said zoom position sensor and a focus position of said focusing lens unit detected by said focusing position sensor; causes said zoom lens unit to move to said zoom target position set by said preset volume, and causes said focusing lens unit to move to a focus position at which an in-focus state is obtained on the basis of an output from said focusing detector when said first operation is performed in said switch, and said controller causes said zoom lens unit to move to the stored zoom position and causes said focusing lens unit to move to the stored focus position when said second operation is performed in said switch.

44. An optical apparatus comprising:

a zoom lens system including a zoom lens unit adapted to move in an optical axis direction;

a zoom position sensor for detecting a position of said zoom lens unit on the optical axis;

a preset switch having an operation member, said preset switch outputting an ON signal when the operation member is operated;

a switch for retaining an ON state by a first operation and retaining an OFF state by a second operation, which is release of said first operation; and a controller for controlling movement of said zoom lens unit on the optical axis, wherein said controller stores a zoom position of said zoom lens unit detected by said zoom position sensor as a preset zoom position when operation of said preset switch is performed, and said controller stores a zoom position of said zoom lens unit detected by said zoom position sensor as a zoom return position and causes said zoom lens unit to move to said preset zoom position set by said preset switch when said first operation is performed in said switch, and said controller causes said zoom lens unit to move to said stored zoom return position when said second operation is performed in said switch.

45. An optical apparatus comprising:

a zoom lens system including a zoom lens unit adapted to move in an optical axis direction;

zoom operation moans for causing said zoom lens unit to move in the optical axis direction;

a zoom position sensor for detecting a position of said zoom lens unit on the optical axis;

a preset switch having an operation member, said preset switch outputting an ON signal when the operation member is operated;

a switch for retaining an ON state by a first operation and retaining an OFF state by a second operation, which is release of said first operation; and a controller for controlling movement of said zoom lens unit on the optical axis, wherein said controller stores a zoom position of said zoom lens unit detected by said zoom position sensor as a preset zoom position when operation of said preset switch is performed, and wherein said controller stores a zoom position of said zoom lens unit detected by said zoom position sensor as a zoom return position and causes said zoom lens unit to move to said preset zoom position set by said preset switch when said first operation is performed in said switch, and wherein said controller causes said zoom lens unit to move to said stored zoom return position when said second operation is performed in said switch, and wherein when said zoom operation means is being operated in the course of movement of said zoom lens unit to the stored zoom return position by said second operation in said switch, said controller renews the stored zoom return position to a renewed zoom return position which is a zoom position detected by said zoom position sensor at a point in time that the operation of said zoom operation means has been completed and said controller stores the renewed zoom return position.

46. A photographing system including an optical apparatus, said photographing system comprising:

a zoom lens system including a zoom lens unit adapted to move in an optical axis direction, the zoom lens system being provided on said optical apparatus;

a photoelectric conversion device for converting light from said zoom lens system of said optical apparatus to an electrical signal;

a zoom position sensor for detecting a position of said zoom lens unit on the optical axis;

a switch for retaining an ON state by a first operation and retaining an OFF state by a second operation, which is release of said first operation;

a preset volume for arbitrary setting a zoom target position of said zoom lens unit; and a controller for controlling movement of said zoom lens unit on the optical axis, wherein said controller stores a zoom position of said zoom lens unit detected by said zoom position sensor and causes said zoom lens unit to move to said zoom target position set by said preset volume when said first operation is performed in said switch, and said controller causes said zoom lens unit to move to the stored zoom position when said second operation is performed in said switch.

47. A photographing system including an optical apparatus, said photographing system comprising:

a zoom lens system including a zoom lens unit adapted to move in an optical axis direction to perform a zooming action, and a focusing lens unit disposed at an image plane side of said zoom lens unit and adapted to move in the optical axis direction to perform a focusing adjustment, the zoom lens system being provided on said optical apparatus;

a photoelectric conversion device for converting light from said zoom lens system of said optical apparatus to an electric signal;

a zoom position sensor for detecting a position of said zoom lens unit on the optical axis;

a focusing position sensor for detecting a position of said focusing lens unit on the optical axis;

a memory in which a focusing position of said focusing lens unit at which an in-focus state is maintained in each of said zoom positions of said zoom lens unit is stored;

a switch for retaining an ON state by a first operation and retaining an OFF state by a second operation, which is release of said first operation;

a preset volume for arbitrary setting a zoom target position of said zoom lens unit; and a controller for controlling movement of said zoom lens unit and said focusing lens unit on the optical axis, wherein said controller stores a zoom position of said zoom lens unit detected by said zoom position sensor and a focus position of said focusing lens unit detected by said focusing position sensor, causes said zoom lens unit to move to said zoom larger position set by said preset volume, and causes said focusing lens unit to move to a focus position corresponding to said zoom target position based on information stored in said memory when said first operation is performed in said switch, and said controller causes said zoom lens unit to move to the stored zoom position and causes said focusing lens unit to move to the stored focus position when said second operation is performed in said switch.

48. A photographing system including an optical apparatus, said photographing apparatus comprising:

a zoom lens system including a zoom lens unit adapted to move in an optical axis direction to perform a zooming action, and a focusing lens unit disposed at an image plane side of said zoom lens unit and adapted to move in the optical axis direction to perform focusing adjustment, the zoom lens system being provided on said optical apparatus;

a photoelectric conversion device for converting light from said zoom lens system of said optical apparatus to an electric signal, said photoelectric conversion device detecting a focus state of an image formed by said zoom lens system;

a zoom position sensor for detecting a position of said zoom lens unit on the optical axis direction;

a focusing position sensor for detecting a position of said focusing lens unit on the optical axis;

a memory in which a focus position of said focusing lens unit at which an in-focus state is maintained in each of said zoom positions of said zoom lens unit is stored;

a switch for retaining an ON state by a first operation and retaining an OFF state by a second operation, which is release of said first operation;

a preset volume for arbitrary setting a zoom target position of said zoom lens unit; and a controller for controller movements of said zoom lens unit and said focusing lens unit on the optical axis, wherein said controller stores a zoom position of said zoom lens unit detected by said zoom position sensor and a focus position of said focusing lens unit detected by said focusing position sensor, causes said zoom lens unit to move to said zoom target position set by said preset volume, and causes said focusing lens unit to move to a focus position at which an in-focus state is obtained on the basis of an output from said focusing detector when said first operation is performed in said switch, and said controller causes said zoom lens unit to move to the stored zoom position and causes said focusing lens unit to move to the stored focus position when said second operation is performed in said switch.

49. A photographing system including an optical apparatus, said photographing system comprising:

a zoom lens system including a zoom lens unit adapted to move in an optical axis direction, the zoom lens system being provided on said optical apparatus;

a photoelectric conversion device for converting light from said zoom lens system of said optical apparatus to an electrical signal;

a zoom position sensor for detecting a position of said zoom lens unit on the optical axis;

a preset switch having an operation member, said preset switch outputting an ON signal when the operation member is operated;

a switch for retaining an ON state by a first operation and retaining an OFF state by a second operation, which is release of said first operation; and a controller for controlling movement of said zoom lens unit on the optical axis, wherein said controller stores a zoom position of said zoom lens unit detected by said zoom position sensor as a preset zoom position when operation of said preset switch is performed, and said controller stores a zoom position of said zoom lens unit detected by said zoom position sensor as a zoom return position and causes said zoom lens unit to move to said preset zoom position set by said preset switch when said first operation is performed in said switch, and said controller causes said zoom lens unit to move to said stored zoom return position when said second operation is performed in said switch.

50. A photographing system including an optical apparatus, said photographing apparatus comprising:
   a zoom lens system including a zoom lens unit adapted to move in an optical axis direction, the zoom lens system being provided on said optical apparatus;
   a photoelectric conversion device for converting light from said zoom lens system of said optical apparatus to an electric signal;
   zoom operation means for causing said zoom lens unit to move in the optical axis direction;
   a zoom position sensor for detecting a position of said zoom lens unit on the optical axis;
   a preset switch having an operation member, said preset switch outputting an ON signal when the operation member is operated;
   a switch for retaining an ON state by a first operation and retaining an OFF state by a second operation, which is release of said first operation; and
   a controller for controlling movement of said zoom lens unit on the optical axis,
   wherein said controller stores a zoom position of said zoom lens unit detected by said zoom position sensor as a preset zoom position when operation of said preset switch is performed, and
   wherein said controller stores a zoom position of said zoom lens unit detected by said zoom position sensor as a zoom return position and causes said zoom lens unit to move to said preset zoom position set by said preset switch when said first operation is performed in said switch, and
   wherein said controller causes said zoom lens unit to move to said stored zoom return position when said second operation is performed in said switch, and
   wherein when said zoom operation means is being operated in the course of movement of said zoom lens unit to the stored zoom return position by said second operation in said switch, said controller renews the stored zoom return position to a renewed zoom return position which is a zoom position detected by said zoom position sensor at a point in time that the operation of said zoom operation means has been completed and said controller stores the renewed zoom return position.

* * * * *

UNITED STATES PATENT AND TRADEMARK OFFICE
CERTIFICATE OF CORRECTION

PATENT NO. : 6,522,838 B1  Page 1 of 1
DATED : February 18, 2003
INVENTOR(S) : Satoshi Natsume et al.

It is certified that error appears in the above-identified patent and that said Letters Patent is hereby corrected as shown below:

Column 7,
Line 51, "located,from" should read -- located from --

Column 8,
Line 38, "circuit 11with" should read -- circuit 11 with --

Column 9,
Line 48, "movement, of" should read -- movement of --

Column 10,
Line 67, "not-carried" should read -- not carried --

Column 12,
Line 34, "switch 9.and" should read -- switch 9 and --

Column 19,
Line 47, "lens-position." should read -- lens position. --

Signed and Sealed this

Ninth Day of September, 2003

JAMES E. ROGAN
*Director of the United States Patent and Trademark Office*